United States Patent
Seo et al.

(10) Patent No.: US 10,651,909 B2
(45) Date of Patent: May 12, 2020

(54) METHOD AND APPARATUS FOR TRANSMITTING CHANNEL STATE INFORMATION IN WIRELESS COMMUNICATION SYSTEM

(71) Applicant: LG ELECTRONICS INC., Seoul (KR)

(72) Inventors: Dongyoun Seo, Anyang-si (KR); Joonkui Ahn, Anyang-si (KR); Daesung Hwang, Anyang-si (KR); Hanbyul Seo, Anyang-si (KR); Illsoo Sohn, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 178 days.

(21) Appl. No.: 14/399,414

(22) PCT Filed: May 7, 2013

(86) PCT No.: PCT/KR2013/003962
§ 371 (c)(1),
(2) Date: Nov. 6, 2014

(87) PCT Pub. No.: WO2013/168969
PCT Pub. Date: Nov. 14, 2013

(65) Prior Publication Data
US 2015/0155928 A1 Jun. 4, 2015

Related U.S. Application Data

(60) Provisional application No. 61/643,899, filed on May 7, 2012, provisional application No. 61/650,987, filed
(Continued)

(51) Int. Cl.
*H04B 7/06* (2006.01)
*H04L 5/00* (2006.01)
*H04B 7/022* (2017.01)

(52) U.S. Cl.
CPC ......... *H04B 7/0626* (2013.01); *H04L 5/0035* (2013.01); *H04L 5/0053* (2013.01);
(Continued)

(58) Field of Classification Search
CPC ..... H04W 72/04; H04W 88/08; H04W 76/00; H04W 88/088; H04B 7/0626;
(Continued)

(56) References Cited

U.S. PATENT DOCUMENTS 8,768,264 B2 * 7/2014 Chakraborty ......... H04L 5/0007
370/252
8,842,622 B2 * 9/2014 Zhang ................... H04B 7/024
370/203
(Continued)

FOREIGN PATENT DOCUMENTS

KR 10-2012-0033249 A 4/2012
KR 10-2012-0033283 A 4/2012
(Continued)

*Primary Examiner* — Hassan A Phillips
*Assistant Examiner* — Prenell P Jones
(74) *Attorney, Agent, or Firm* — Dentons US LLP

(57) ABSTRACT

The present invention relates to a method and apparatus for transmitting channel state information (CSI) on a terminal having a plurality of cells allocated in a wireless communication system. The method includes the steps of: setting a plurality of cells as a plurality of groups, at least one of the groups including a plurality of cells; determining a priority for each of the groups; and transmitting multiple pieces of CSI for a top priority group having a highest priority from among the groups on the basis of the priority, wherein, when
(Continued)

the top priority group includes two or more cells, the CSI includes each piece of CSI on each of the two or more cells.

7 Claims, 16 Drawing Sheets

Related U.S. Application Data on May 23, 2012, provisional application No. 61/659,977, filed on Jun. 15, 2012, provisional application No. 61/662,892, filed on Jun. 21, 2012.

(52) U.S. Cl.
CPC ............ *H04L 5/0057* (2013.01); *H04B 7/022* (2013.01); *H04L 5/001* (2013.01)

(58) Field of Classification Search
CPC ..... H04B 7/022; H04L 5/0057; H04L 5/0053; H04L 5/0035
See application file for complete search history.

(56) References Cited

U.S. PATENT DOCUMENTS

| | | | | |
|---|---|---|---|---|
| 9,729,273 | B2* | 8/2017 | Khoshnevis | H04L 5/0057 |
| 2010/0027456 | A1* | 2/2010 | Onggosanusi | H04B 7/024 370/312 |
| 2010/0226269 | A1* | 9/2010 | Chakraborty | H04L 5/0007 370/252 |
| 2010/0315989 | A1* | 12/2010 | Reznik | H04B 7/15557 370/315 |
| 2011/0244847 | A1* | 10/2011 | Mallik | H04B 7/024 455/422.1 |
| 2011/0305161 | A1* | 12/2011 | Ekpenyong | H04L 1/0031 370/252 |
| 2012/0039252 | A1* | 2/2012 | Damnjanovic | H04L 1/0026 370/328 |
| 2012/0076028 | A1* | 3/2012 | Ko | H04L 1/0026 370/252 |
| 2012/0113832 | A1* | 5/2012 | Montojo | H04L 1/0026 370/252 |
| 2012/0176884 | A1* | 7/2012 | Zhang | H04B 7/024 370/203 |
| 2012/0220286 | A1* | 8/2012 | Chen | H04W 24/10 455/422.1 |
| 2012/0250618 | A1* | 10/2012 | Abraham | H04B 7/0417 370/328 |
| 2012/0314613 | A1* | 12/2012 | Zhang | H04B 7/0486 370/252 |
| 2013/0114455 | A1* | 5/2013 | Yoo | H04W 24/00 370/252 |
| 2013/0244670 | A1* | 9/2013 | Biermann | H04B 7/024 455/446 |
| 2013/0258874 | A1* | 10/2013 | Khoshnevis | H04L 5/0057 370/252 |
| 2013/0258965 | A1* | 10/2013 | Geirhofer | H04W 72/048 370/329 |
| 2013/0258973 | A1* | 10/2013 | Khoshnevis | H04W 72/1226 370/329 |
| 2013/0301548 | A1* | 11/2013 | Etemad | H04W 76/048 370/329 |
| 2015/0063252 | A1* | 3/2015 | Zhang | H04B 7/024 370/329 |
| 2015/0244439 | A1* | 8/2015 | Nam | H04L 5/0048 370/329 |

FOREIGN PATENT DOCUMENTS

| | | |
|---|---|---|
| WO | 2011-121063 A1 | 10/2011 |
| WO | 2011-122911 A2 | 10/2011 |
| WO | 2012-024181 A1 | 2/2012 |

* cited by examiner

METHOD AND APPARATUS FOR TRANSMITTING CHANNEL STATE INFORMATION IN WIRELESS COMMUNICATION SYSTEM

This application is a 35 USC § 371 National Stage entry of International Application No. PCT/KR2013/003962 filed on May 7, 2013, and claims priority to U.S. Provisional Application Nos. 61/643,899 filed on May 7, 2012, 61/650, 987 filed on May 23, 2012, 61/659,977 filed on Jun. 15, 2012 and 61/662,892 filed on Jun. 21, 2012, all of which are hereby incorporated by reference in their entireties as if fully set forth herein.

BACKGROUND OF THE INVENTION

Field of the Invention

The present invention relates to wireless communication, and more particularly, to a method and apparatus for transmitting channel state information in a wireless communication system.

Related Art

One of most importance requirement conditions in a next-generation wireless communication system is to support a data transmission rate. To this end, various technologies such as multiple input multiple output, MIMO), cooperative multiple point transmission (CoMP), relay, and the like have been researched, but the most basic and stable solution is to increase a band width.

A frequency source is in a saturated state based on the current, and various technologies have been partially used in a wide frequency band. To this reason, in order to satisfy a higher demand quantity of the data transmission rate, as a method for ensuring a wide bandwidth, carrier aggregation (CA) has been introduced, which is a concept in which each of distributed bands is designed to satisfy basic requirements capable of operating an independent system and a plurality of bands is bound as one system. In this case, a band or a carrier which can be independently operated is defined as a component carrier (CC).

In recent communication standard, for example, standard such as 3rd generation partnership project (3GPP), long term evolution-advanced (LTE-A), or 802.16m, it is considered that the bandwidth is continuously extended up to 20 MHz or more. In this case, the wideband is supported by aggregating one or more component carriers. For example, when one component carrier corresponds to a bandwidth of 5 MHz, a bandwidth of maximum 20 MHz is supported by aggregating four carriers. As such, a system of supporting carrier aggregation is called a carrier aggregation system.

Meanwhile, a modulation and coding scheme (MCS) and transmission power are controlled according to a given channel by using link adaptation in order to maximally use a channel capacity given in the wireless communication system. In order for the base station to perform the link adaptation, feedback of channel state information of the user equipment is required.

According to the related art, in the carrier aggregation system, when collision in which periodic channel state information for each of the plurality of carriers is configured to be simultaneously transmitted in a specific subframe occurs, only the periodic channel state information for one carrier determined according to the priority is transmitted. Further, when acknowledgement/not-acknowledgement (ACK/NACK) transmission for the downlink data collides with the periodic channel state information, the periodic channel state information is not transmitted but dropped. Accordingly, it is difficult to faithfully perform periodic channel state information reporting.

Method and apparatus of transmitting the channel state information which may be applied in the carrier aggregation system are required.

SUMMARY OF THE INVENTION

The present invention has been made in an effort to a method and apparatus for transmitting channel state information in a wireless communication system.

An embodiment of the present invention provides a method for transmitting channel state information (CSI) of user equipment receiving a plurality of cells in a wireless communication system. The method includes: configuring the plurality of cells to a plurality of groups, at least one group among the plurality of groups includes the plurality of cells; determining a priority for each group; and transmitting multiple pieces of CSI on a first priority group having a highest priority among the groups based on the priority, the multiple pieces of CSI include many pieces of CSI on each of two or more cells when two or more cells are included in the first priority group.

Another embodiment of the present invention provides user equipment including: a radio frequency (RF) unit which transmits or receives a radio signal; and a processor connected with the RF unit, in which the processor configures the plurality of cells to a plurality of groups, at least one group among the plurality of groups includes the plurality of cells, determines a priority for each group, and transmits multiple pieces of CSI on a first priority group having a highest priority among the groups based on the priority, the multiple pieces of CSI include many pieces of CSI on each of two or more cells when two or more cells are included in the first priority group.

According to the present invention, it is possible to efficiently transmit multiple channel state information for a plurality of cells.

DESCRIPTION OF EMBODIMENTS

Long term evolution (LTE) for a 3rd generation partnership project (3GPP) standard organization, as a part of evolved-UMTS (E-UMTS) using an evolved-universal terrestrial radio access network (E-UTRAN), adopts orthogonal frequency division multiple access (OFDMA) in a downlink, and adopts single carrier-frequency division multiple access (SC-FDMA) in a uplink. LTE-A (advanced) is an evolution of the LTE. Hereinafter, LTE/LTE-A is primarily described for clear description, but the spirit of the present invention is not limited thereto.

A wireless device may be fixed or movable and may be called other terms such as user equipment (UE), a mobile station (MS), a mobile terminal (MT), a user terminal (UT), a subscriber station (SS), a personal digital assistant (PDA), a wireless modem, a handheld device, and the like. Alternatively, the wireless device may be a device that supports only data communication, such as a machine-type communication (MTC) device.

A base station (BS) generally represents a fixed station that communicates with the wireless device and may be called different terms such as an evolved-NodeB (eNB), a base transceiver system (BTS), an access point, and the like.

Hereinafter, it is described that the present invention is applied based on 3rd Generation Partnership Project (3GPP) long term evolution (LTE) based on 3GPP technical specification (TS) release 8 or 3GPP LTE-A based on 3GPP TS release 10. This is just an example and the present invention may be applied to various wireless communication networks. Hereinafter, LTE includes LTE and/or LTE-A.

Figure 1:
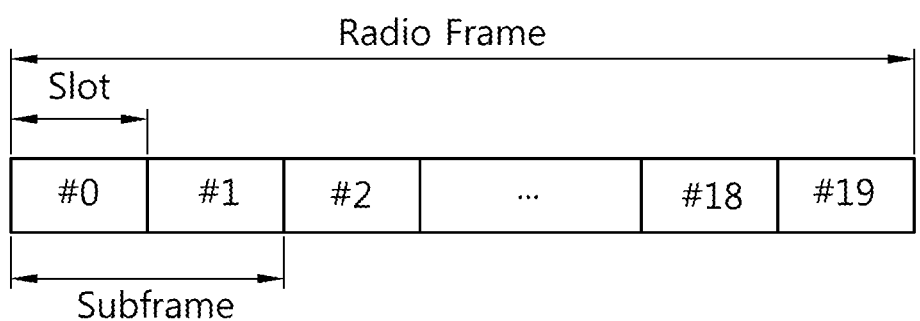
FIG. 1 illustrates a structure of a downlink radio frame in 3GPP LTE-A.

FIG. 1 illustrates a structure of a downlink radio frame in 3GPP LTE-A. This may refer to a chapter 6 of 3GPP TS 36.211 V10.4.0 (2011-16) "Evolved Universal Terrestrial Radio Access (E-UTRA); Physical Channels and Modulation (Release 10)".

The radio frame includes 10 subframes having indexes of 0 to 9. One subframe includes two contiguous slots. A time taken to transmit one subframe is called a transmission time interval (TTI), and for example, a length of one subframe is 1 ms, and a length of one slot may be 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is just to express one symbol period in the time domain, and is not limited to a multiple access method or name. For example, the OFDM symbol may be referred to as other names such as a single carrier-frequency division multiple access (SC-FDMA) symbol and a symbol period.

An example in which one slot includes 7 OFDM symbols is described, but the number of OFDM symbols included in one slot may vary according to a length of a cyclic prefix (CP). According to 3GPP TS 36.211 V10.2.0, in a normal CP, one slot includes 7 OFDM symbols, and in an extended CP, one slot includes 6 OFDM symbols.

A resource block (RB) as a resource allocation unit includes a plurality of contiguous subcarriers in one slot. For example, when one slot includes 7 OFDM symbols in the time domain and the RB includes 12 subcarriers in a frequency domain, one RB may include 7×12 resource elements (REs).

Figure 2:
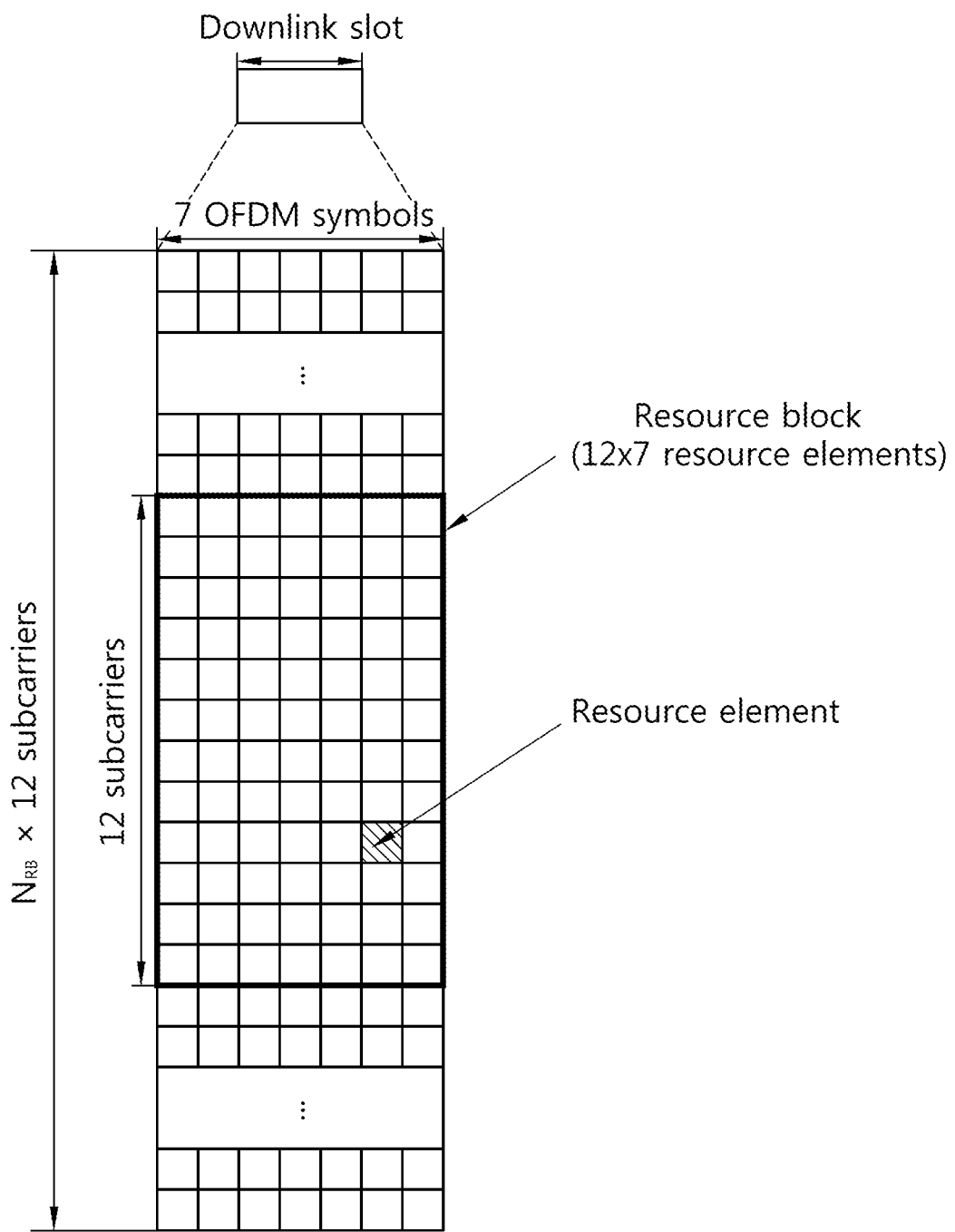
FIG. 2 illustrates one example of a resource grid for one downlink slot.

FIG. 2 illustrates one example of a resource grid for one downlink slot.

Referring to FIG. 2, the downlink slot may include a plurality of OFDM symbols in a time domain and NRB resource blocks (RBs) in a frequency domain. The resource block as the resource allocation unit includes one slot in the time domain and a plurality of contiguous subcarriers in the frequency domain. The number NRB of resource blocks included in the downlink slot is subordinate to a downlink bandwidth set in a cell. For example, in an LTE system, NRB may be any one of 6 to 110. The structure of an uplink slot may also be the same as that of the downlink slot.

Each element on the resource grid is called a resource element (RE). The resource element on the resource grid may be identified by a pair of indexes (k,l) in the slot. Herein, k (k=0, . . . , NRB×12−1) represents a subcarrier index in the frequency domain, and l (l=0, . . . , 6) represents an OFDM symbol index in the time domain.

In FIG. 2, it is exemplarily described that one resource block is constituted by 7 OFDM symbols in the time domain and 12 subcarriers in the frequency domain and thus includes 7×12 resource elements, but the number of the OFDM symbols and the number of the subcarriers in the resource block are not limited thereto. The number of the OFDM symbols and the number of the subcarriers may be variously changed depending on the length of the CP, frequency spacing, and the like. As the number of subcarriers in one OFDM symbol, one of 128, 256, 512, 1024, 1536, and 2048 may be selected and used.

Figure 3:
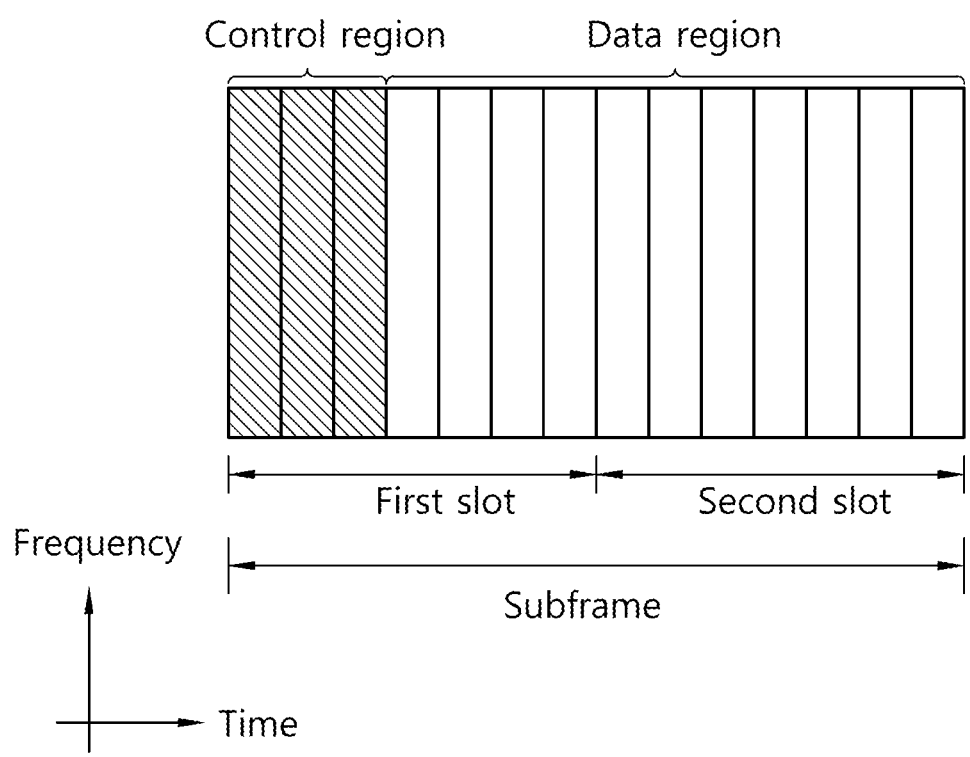
FIG. 3 illustrates a downlink subframe.

FIG. 3 illustrates a downlink subframe.

A downlink (DL) subframe is divided into a control region and a data region in the time domain. The control region includes maximum four previous OFDM symbols of a first slot in the subframe, but the number of OFDM symbols included in the control region may be changed. A physical downlink control channel (PDCCH) and other control channel are allocated to the control region and a PDSCH is allocated to the data region.

As disclosed in the 3GPP TS 36.211 V10.2.0, in 3GPP LTE/LTE-A, a physical control channel includes a physical downlink control channel (PDCCH), a physical control format indicator channel (PCFICH), and a physical hybrid-ARQ indicator channel (PHICH).

The PCFICH transmitted in a first OFDM symbol of the subframe transports a control format indicator (CFI) regarding the number (that is, the size of the control region) of OFDM symbols used to transmit control channels in the subframe. The wireless device first receives the CFI on the PCFICH and thereafter, monitors the PDCCH.

Unlike the PDCCH, the PCFICH is transmitted through a fixed PCFICH resource of the subframe without using blind decoding.

The PHICH transports a positive-acknowledgment (ACK)/negative-acknowledgement (NACK) signal for an uplink (UL) hybrid automatic repeat request (HARQ). An ACK/NACK signal for uplink (UL) data on the PUSCH transmitted by the wireless device is transmitted on the PHICH.

A physical broadcast channel (PBCH) is transmitted in four previous OFDM symbols of a second slot of the first subframe of the radio frame. The PBCH transports system information required for the wireless device to communicate with the base station, and the system information transmitted through the PBCH is called a master information block (MIB). As compared therewith, system information transmitted on the PDSCH instructed by the PDCCH is called a system information block (SIB).

Control information transmitted through the PDCCH is called downlink control information (DCI). The DCI may include resource allocation (also referred to as downlink (DL) grant) of the PDSCH, resource allocation (also referred to as uplink (UL) grant) of the PUSCH, a set of transmission power control commands for individual UEs in a predetermined UE group, and/or activation of a voice over Internet protocol (VoIP).

In 3GPP LTE/LTE-A, transmission of the DL transmission block is performed in a pair of the PDCCH and the PDSCH. Transmission of the DL transmission block is performed in a pair of the PDCCH and the PDSCH. For example, the wireless device receives the DL transmission block on the PDSCH instructed by the PDCCH. The wireless device monitors the PDCCH in the DL subframe to receive the DL resource allocation on the PDCCH. The wireless device receives the DL transmission block on the PDSCH where the DL resource allocation is indicated.

The base station determines a PDCCH format according to a DCI to be transmitted to the wireless device and then adds a cyclic redundancy check (CRS) to the DCI, and masks a unique identifier (referred to as a radio network temporary identifier (RNTI)) to the CRS according to an owner or a usage of the PDCCH.

In the case of a PDCCH for a specific wireless device, a unique identifier of the wireless device, for example, a cell-RNTI (C-RNTI) may be masked on the CRC. Alternatively, in the case of a PDCCH for a paging message, a paging indication identifier, for example, a paging-RNTI (P-RNTI) may be masked on the CRC. In the case of a PDCCH for system information, a system information-RNTI (SI-RNTI) may be masked on the CRC. A random access-RNTI (RA-RNTI) may be masked on the CRC in order to indicate the random access response which is a response to transmission of a random access preamble. In order to instruct a transmit power control (TPC) command for a plurality of wireless devices, the TPC-RNTI may be on the CRC. In the PDCCH for semi-persistent scheduling (SPS), the SPS-C-RNTI may be masked on the CRC.

When the C-RNTI is used, the PDCCH transports control information (referred to as UE-specific control information) for the corresponding specific wireless device, and when another RNTI is used, the PDCCH transports common control information which all or a plurality of wireless devices in the cell receive.

Coded data is generated by encoding the DCI added with the CRC. The encoding includes channel encoding and rate matching. The coded data is modulated to generate modulated symbols. The modulated symbols are mapped on a physical RE.

The control region in the subframe includes a plurality of control channel elements (CCEs). The CCE as a logical allocation unit used to provide the coding rate to the PDCCH depending on a state of a radio channel corresponds to a plurality of resource element groups (REGs). The REG includes a plurality of resource elements. A format of the PDCCH and the bit number of available PDCCH are determined according to a correlation of the number of CCEs and the coding rate provided by the CCEs.

One REG includes four REs, and one CCE includes nine REGs. In order to configure one PDCCH, {1, 2, 4, 8} CCEs may be used, and each element of {1, 2, 4, 8} is referred to as a CCE aggregation level.

The number of CCEs used for the transmission of the PDDCH is determined according to a channel state. For example, in the wireless device having a good downlink channel state, one CCE may be used for the transmission of the PDDCH. For example, in the wireless device having a poor downlink channel state, eighth CCEs may be used for the transmission of the PDDCH.

A control channel configured by one or more CCEs performs interleaving of a REG unit, and is mapped on the physical resource after a cyclic shift based on a cell identifier (ID) is performed.

Figure 4:
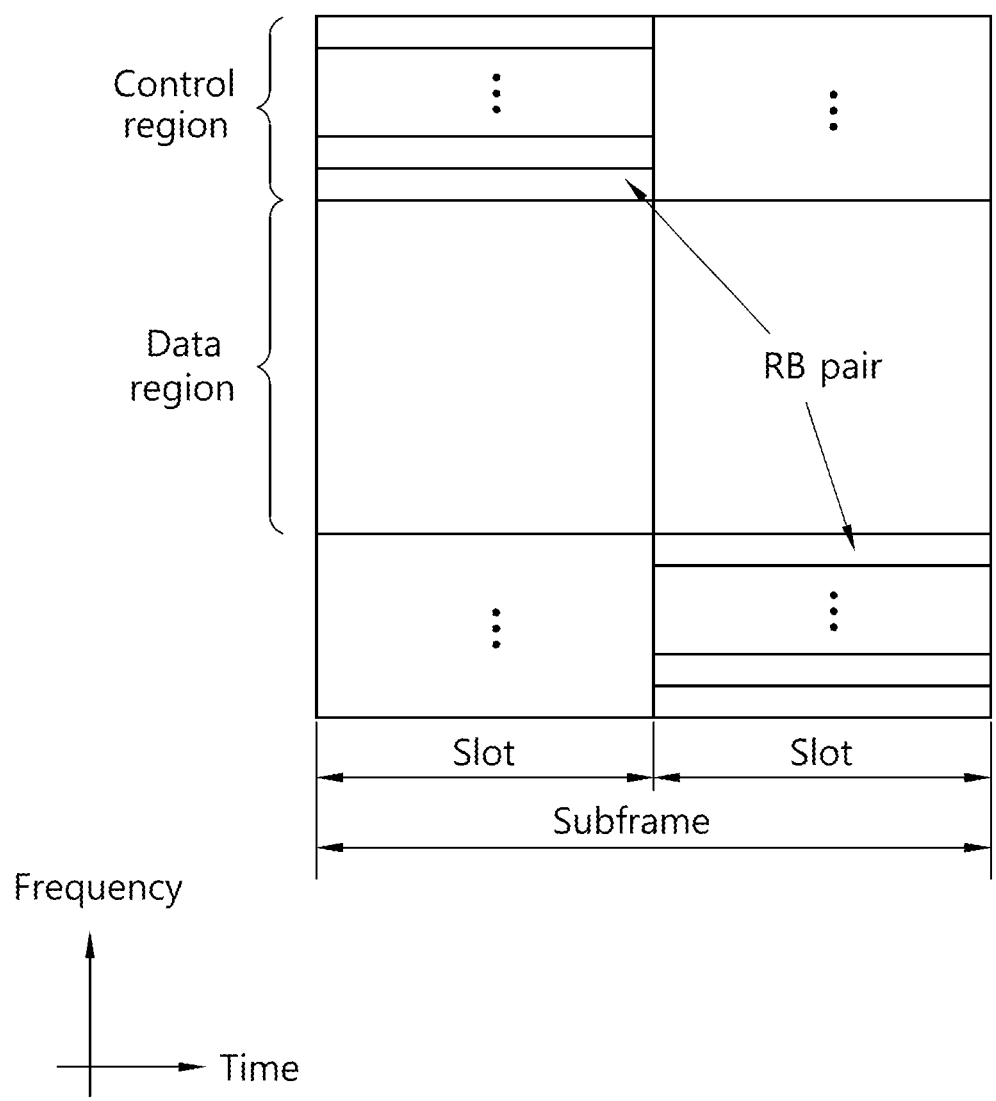
FIG. 4 illustrates a structure of an uplink subframe.

FIG. 4 illustrates a structure of an uplink subframe.

Referring to FIG. 4, an uplink subframe may be divided into a control region and a data region in a frequency domain. A physical uplink control channel (PUCCH) for transmitting uplink control information is allocated to the control region. A physical uplink shared channel (PUSCH) for transmitting data (in some cases, control information may be transmitted together) is allocated to the data region. According to a configuration, the UE may simultaneously transmit the PUCCH and the PUSCH and may transmit only one of the PUCCH and the PUSCH.

A PUCCH for one UE is allocated to a RB pair in the subframe. The RBs that belong to the RB pair occupy different subcarriers in first and second slots, respectively. A frequency occupied by the RBs that belong to the RB pair allocated to the PUCCH is changed based on a slot boundary. This means that the RB pair allocated to the PUCCH is frequency-hopped on the slot boundary. The UE transmits the uplink control information through different subcarriers with time to acquire a frequency diversity gain.

On the PUCCH, a hybrid automatic repeat request (HARQ) acknowledgement (ACK)/non-acknowledgement (NACK), channel state information (CSI) indicating a downlink channel state, for example, a channel quality indicator (CQI), a precoding matrix index (PMI), a precoding type indicator (PTI), a rank indication (RI), and the like may be transmitted.

The CQI provides information on link adaptive parameters which can be supported by the UE for a predetermined time. The CQI may indicate a data rate which may be supported by the DL channel by considering a characteristic of the UE receiver, a signal to interference plus noise ratio (SINR), and the like. The base station may determine modulation (QPSK, 16-QAM, 64-QAM, and the like) to be applied to the DL channel and a coding rate by using the CQI. The CQI may be generated by various methods. For example, the various methods include a method of quantizing and feed-backing the channel state as it is, a method of calculating and feed-backing a signal to interference plus noise ratio (SINR), a method of notifying a state which is actually applied to the channel such as a modulation coding scheme (MCS), and the like. When the CQI is generated based on the MCS, the MCS includes a modulation scheme, a coding scheme, and a coding rate according to the coding scheme, and the like.

The PMI provides information on a precoding matrix in precoding based on a code book. The PMI is associated with the multiple input multiple output (MIMO). The feed-backing of the PMI in the MIMO may be called a closed loop MIMO.

The RI is information on a rank (that is, the number of layers) recommended by the UE. That is, the RI represents the number of independent streams used in spatial multiplexing. The RI may be fed-back only in the case where the UE operates in an MIMO mode using the spatial multiplexing. The RI is always associated with one or more CQI feed-backs. That is, the fed-back CQI is calculated by assuming a predetermined RI value. Since the rank of the channel is generally changed slower than the CQI, the RI is fed-back less than the number of CQIs. A transmission period of the RI may be a multiple of the CQI/PMI transmission period. The RI is provided in the entire system band, and a frequency-selective RI feedback is not supported.

Periodic channel state information may be transported through the PUCCH.

The PUSCH is mapped in an uplink shared channel (UL-SCH) which is a transport channel. Uplink data transmitted on the PUSCH may be a transport block which is a data block for the UL-SCH transmitted during the TTI. The transport block may be user information. Alternatively, the uplink data may be multiplexed data. The multiplexed data may be acquired by multiplexing the transport block for the UL-SCH and the channel state information. For example, the channel state information (CSI) multiplexed in the data may include the CQI, the PMI, the RI, and the like. Alternatively, the uplink data may be constituted by only the uplink control information. Periodic or aperiodic channel state information may be transmitted through the PUSCH.

[Semi-Persistent Scheduling (SPS)]

The UE in the wireless communication system receives scheduling information such as the DL grant and the UL grant through the PDCCH, and the UE performs an operation of receiving the PDSCH and the transmitting the PUSCH based on the scheduling information. Generally, the DL grant and the PDSCH are received in the same subframe. In addition, in the case of the FDD, the PUSCH is transmitted after four subframes from the subframe receiving the UL grant. The LTE provides semi-persistent scheduling (SPS) in addition to the dynamic scheduling.

The downlink or uplink SPS may notify that semi-persistent transmission (PUSCH)/reception (PDSCH) from/to the UE is performed in any subframes through an higher layer signal such as radio resource control (RRC). Parameters provided to the higher layer signal may be, for example, a period and an offset value of the subframe.

When the UE receives activation and release signals of the SPS transmission through the PDCCH after recognizing the SPS transmission/reception through the RRC signaling, the SPS transmission/reception is performed or released. That is, even though the UE receives the SPS through the RRC signaling, when the SPS transmission/reception is not directly performed and the activation or release signal is received through the PDCCH, the SPS transmission/reception is performed in the subframe corresponding to the subframe period and the offset value received through the RRC signaling by applying a frequency resource (resource block) according to the resource block allocation assigned in the PDCCH, modulation according to MCS information, and the coding rate. When the release signal is received through the PDCCH, the SPS transmission/reception stops. When the PDCCH (SPS reactivation PDCCH) including the activation signal is received again, the stopped SPS transmission/reception restarts by using the frequency resource assigned in the corresponding PDCCH, the MCS, and the like.

Hereinafter, a PDCCH for SPS activation is referred to as an SPS activation PDCCH, and a PDCCH for SPS release is referred to as an SPS release PDCCH. The UE may validate whether the PDCCH is the SPS activation/release PDCCH in the case of satisfying the following conditions. 1. CRS parity bits obtained from the PDCCH payload are scrambled to the SPS C-RNTI, and 2. A value of a new data indicator field needs to be '0'. Further, each field value included in the PDCCH is set as values of the following table, the UE receives the downlink control information (DCI) of the corresponding PDCCH as the SPS activation or release.

TABLE 1

| | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: MSB is set to '00' |

Table 1 illustrates field values of the SPS activation PDCCH for validating the SPS activation.

TABLE 2

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | set to all '1's |

Table 2 illustrates field values of the SPS release PDCCH for validating the SPS release.

[Method for Transmitting Channel State Information in Wireless Communication System]

The MCS and the transmission power are controlled according to a provided channel by using link adaptation in order to maximally use a channel capacity provided in the wireless communication system. In order for the base station to perform the link adaptation, feed-backing of channel state information of the UE is required.

1. Channel State Information (CSI) CSI

Feed-backing of channel information is required for efficient communication, and in general, downlink channel information is transmitted through the uplink and uplink channel information is transmitted through the downlink. Channel information representing the channel state is referred to as the channel state information, and the channel state information includes a precoding matrix index (PMI), a rank indicator (RI), a channel quality indicator (CQI), and the like. The CSI may be generated by measuring a reference signal or data which is received by the UE. In the reference signal, a cell-specific reference signal (CRS), a channel state information reference signal (CSI-RS), a user equipment-specific reference signal (URS), and the like which are common in the cell may be variously included.

2. Downlink Transmission Mode.

The downlink transmission mode may be divided into nine modes to be described below.

Transmission mode 1: Single antenna port, port 0

Transmission mode 2: Transmit diversity

Transmission mode 3: Open loop spatial multiplexing The transmission mode 3 is an open loop mode in which rank adaptation is available based on RI feedback. When a rank is 1, the transmit diversity may be applied. When the rank is larger than 1, a large delay CDD may be used.

Transmission mode 4: Closed loop spatial multiplexing or transmit diversity

Transmission mode 5: Transmit diversity or multi-user MIMO

Transmission mode 6: Transmit diversity or closed-loop spatial multiplexing having a single transmission layer Transmission mode 7: If the number of PBCH antenna ports is 1, a single antenna port (port 0) is used, and if not, the transmit diversity is used. Alternatively, single antenna transmission (port 5)

Transmission mode 8: If the number of PBCH antenna ports is 1, the single antenna port (port 0) is used, and if not, the transmit diversity is used. Alternatively, a dual layer is transmitted by using antenna ports 7 and 8, or a single antenna port is transmitted by using port 7 or 8.

Transmission mode 9: Transmission of maximum 8 layers (ports 7 to 14). In the case where there is no multicast-broadcast single frequency network (MBSFN) subframe, if the number of PBCH antenna ports is 1, the single antenna port (port 0) is used, and if not, the transmit diversity is used. In the case of the MBSFN subframe, a single antenna port (port 7) is transmitted.

3. Periodic Transmission of CSI.

The CSI may be transmitted through the PUCCH periodically according to a period determined in the higher layer. The UE may be semistatically configured by an higher layer signal so as to periodically feed-back differential CSI (CQI, PMI, and RI) through the PUCCH. In this case, the UE transmits the corresponding CSI according to modes defined in the following Table.

TABLE 3

| | PMI Feedback Type | |
|---|---|---|
| | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

A periodic CSI reporting mode in the PUCCH described below is supported for each of the aforementioned transmission modes.

TABLE 4

| Transmission mode | PUCCH CSI reporting modes |
|---|---|
| Transmission mode 1 | Modes 1-0, 2-0 |
| Transmission mode 2 | Modes 1-0, 2-0 |

TABLE 4-continued

| Transmission mode | PUCCH CSI reporting modes |
|---|---|
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | Modes 1-1, 2-1 when PMI/RI reporting is set to UE; Modes 1-0, 2-0 when PMI/RI reporting is not set to UE |
| Transmission mode 9 | Modes 1-1, 2-1 when PMI/RI reporting is set to UE and the number of CSI-RS ports is larger than 1. Modes 1-0, 2-0 when PMI/RI reporting is not set to UE or the number of CSI-RS ports is 1. |

Meanwhile, a collision of the CSI report means a case where a subframe configured to transmit first CSI and a subframe configured to transmit second CSI are the same as each other. When the collision of the CSI report occurs, the first CSI and the second CSI are simultaneously transmitted, or transmission of CSI having a low priority is abandoned (referred to as "dropped"), and CSI having a high priority may be transmitted according to priorities of the first CSI and the second CSI.

The CSI report through the PUCCH may include various following report types according to a transmission combination of the CQI, the PMI, and the RI, and a period and an offset value divided according to each report type (hereinafter, abbreviated as a CSI type or a type) are supported.

Type 1: Supports CQI feedback for subband selected by the UE.

Type 1a: Supports subband CQI and second PMI feedback.

Types 2, 2b, and 2c: Supports wideband CQI and PMI feedback.

Type 2a: Supports wideband PMI feedback.

Type 3: Supports RI feedback.

Type 4: Transmits wideband CQI.

Type 5: Supports RI and wideband PMI feedback.

Type 6: Supports RI and PTI feedback.

For each serving cell, $N_{pd}$ which is a subframe-unit period and an offset $N_{offset,CQI}$ are determined based on a parameter 'cqi-pmi-ConfigIndex' (ICQI/PMI) with respect to CQI/PMI reporting. Further, with respect to each serving cell, a period $M_{RI}$ and a relative offset $N_{offset,RI}$ are determined based on a parameter 'ri-ConfigIndex' (IRI) for RI reporting. The 'cqi-pmi-ConfigIndex' and the 'ri-ConfigIndex' are configured by the higher layer signal such as the RRC message. The relative offset $N_{offset,RI}$ for the RI has a value in a set $\{0, -1, \ldots, -(N_{pd}-1)\}$.

A subframe configured to report the CSI by the UE is referred to as a CSI subframe (alternatively, CSI transmission subframe), and a CSI subframe set configured by a plurality of CSI subframes may be configured in the UE. If reporting is configured in two or more CSI subframe sets to the UE, 'cqi-pmi-ConfigIndex' and 'ri-ConfigIndex' corresponding to each CSI subframe set are given. For example, when CSI reporting is configured in two CSI subframe sets, 'cqi-pmi-ConfigIndex' and 'ri-ConfigIndex' are for a first CSI subframe set and 'cqi-pmi-ConfigIndex2' and 'ri-ConfigIndex2' are for a second CSI subframe set.

With respect to each serving cell, $N_{pd}$ which is a subframe-unit period and an offset $N_{offset,CQI}$ are determined based on a parameter 'cqi-pmi-ConfigIndex' (ICQI/PMI) for CQI/PMI reporting.

As an example, when wideband CQI/PMI reporting is configured, subframes performing the wideband CQI/PMI reporting may be subframes satisfying the following Equation.

$$(10 \times n_f + \lfloor n_s/2 \rfloor - N_{OFFSET,CQI}) \bmod (N_{pd}) = 0 \quad \text{[Equation 1]}$$

In Equation 1, $n_f$ represents a system frame number, and $n_s$ is a slot number in the frame.

Further, with respect to each serving cell, a period $M_{RI}$ and a relative offset $N_{offset,RI}$ are determined based on a parameter 'ri-ConfigIndex' ($I_{RI}$) for RI reporting. 'cqi-pmi-ConfigIndex' and 'ri-ConfigIndex' are set by the higher layer signal such as the RRC message. The relative offset $N_{offset,RI}$ for the RI has a value in a set $\{0, -1, \ldots -(N_{pd}-1)\}$.

When the RI reporting is configured, subframes in which the RI is reported may be subframes satisfying the following Equation.

$$(10 \times n_f + \lfloor n_s/2 \rfloor - N_{OFFSET,CQI} - N_{OFFSET,RI}) \bmod (N_{pd} \cdot M_{RI}) = 0 \quad \text{[Equation 2]}$$

As illustrated in Equation 2, a reporting distance of the RI reporting is $M_{RI}$ times of the $N_{pd}$.

When both the wideband CQI/PMI reporting and the subband CQI reporting are configured, the wideband CQI/PMI reporting and the subband CQI reporting may be performed in the subframes satisfying the following Equation.

$$(10 \times n_f + \lfloor n_s/2 \rfloor - N_{OFFSET,CQI}) \bmod (N_{pd}) = 0 \quad \text{[Equation 3]}$$

When the precoding type indicator (PTI) is not transmitted (not configured) or the latest transmitted PTI is 1, wideband CQI/wideband PMI (alternatively, a wideband second PMI for wideband CQI/transmission mode 9) reporting is transmitted from the subframes having a period of $H \cdot N_{pd}$ and satisfying the following Equation.

$$(10 \times n_f + \lfloor n_s/2 \rfloor - N_{OFFSET,CQI}) \bmod (H \cdot N_{pd}) = 0 \quad \text{[Equation 4]}$$

In Equation 4, H is an integer, and H is defined as $J \cdot K + 1$. J is a number of a bandwidth part, and K is set by the higher layer.

When latest transmitted PTI is 0, a wideband first PMI indicator reporting is transmitted from the subframes having a period of $H' \cdot N_{pd}$ and satisfying the following Equation.

$$(10 \times n_f + \lfloor n_s/2 \rfloor - N_{OFFSET,CQI}) \bmod (H' \cdot N_{pd}) = 0 \quad \text{[Equation 5]}$$

H' is signaled by the higher layer.

Between contiguous two wideband first PMI indicator reportings, remaining reporting chances are used for the wideband second PMI indicator and the wideband CQI reporting. When the RI reporting is configured, an interval of the RI reporting is a product of $H \cdot N_{pd}$ and $M_{RI}$ which is a wideband CQI/PMI reporting period. The RI reporting may be performed in the subframes satisfying the following Equation.

$$(10 \times n_f + \lfloor n_s/2 \rfloor \cdot N_{OFFSET,CQI} - N_{OFFSET,RI}) \bmod (H \cdot N_{pd} \cdot M_{RI}) = 0 \quad \text{[Equation 6]}$$

Figure 5:
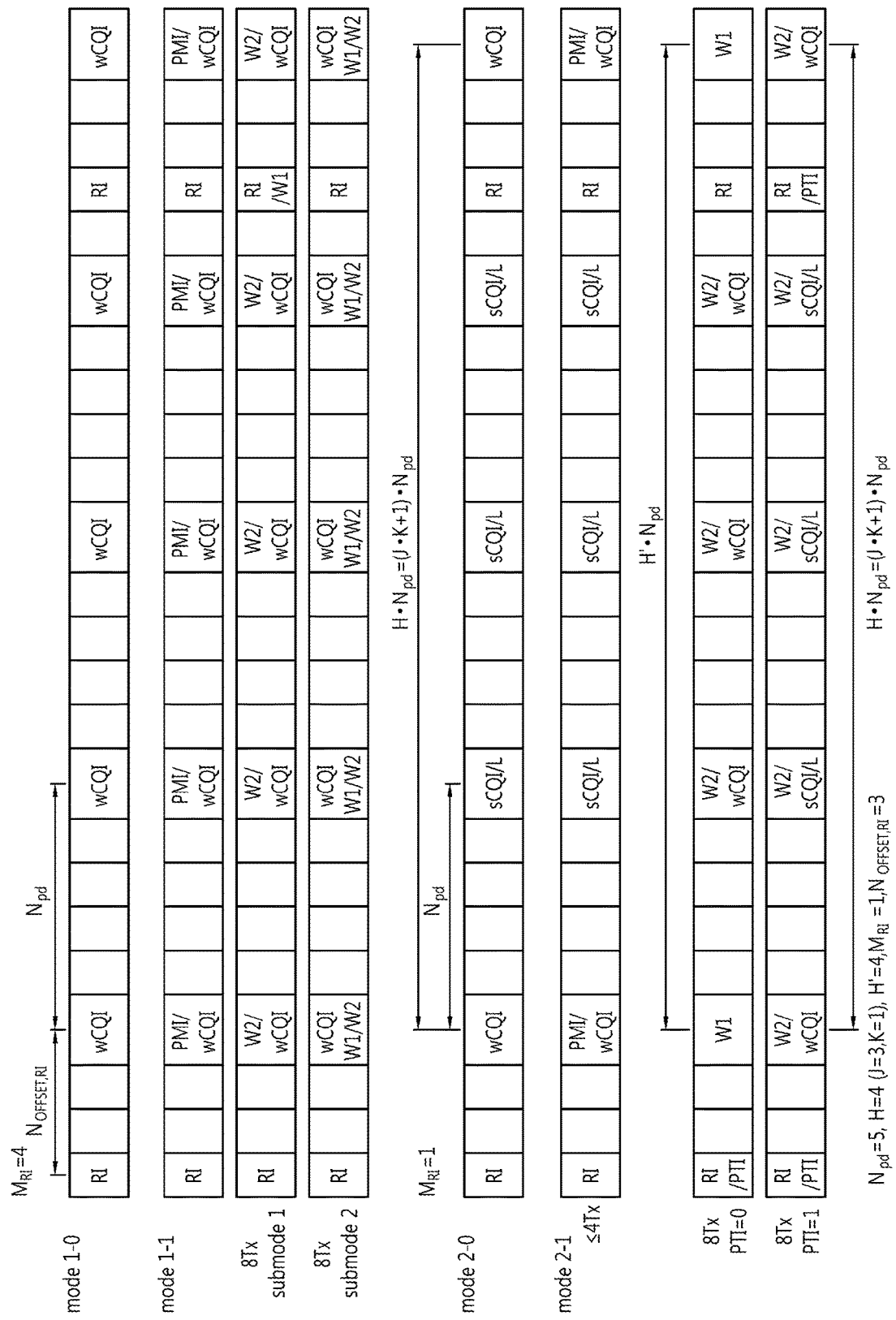
FIG. 5 illustrates CSI transmission periods and reporting types according to each mode of Table 3.

FIG. 5 illustrates CSI transmission periods and reporting types according to each mode of Table 3. However, it is assumed that $N_{pd}=5$, $H=4$, $J=3$, $K=1$, $H'=4$, $M_{RI}=1$, and $N_{OFFSET,RI}=3$. In addition, 'wCQI' represents wideband CQI, 'sCQI' represents subband CQI, W1 represents a wideband first PMI indicator, and W2 represents a wideband second PMI indicator.

4. Aperiodic Transmission of CSI.

A control signal requesting to transmit the CSI, that is, an aperiodic CSI request signal may be included in a scheduling control signal for the PUSCH transmitted to the PDCCH, that is, the UL grant. In this case, the UE aperidically reports the CSI through the PUSCH.

1) Transmission of CQI/PMI/RI through PUSCH after receiving CQI transmission request signal (CQI request)

In this case, a control signal (CQI request) for requesting to transmit the CQI to the PUSCH scheduling control signal (UL grant) transmitted to the PDCCH is included. The following Table 5 illustrates modes when the CQI/PMI/RI are transmitted through the PUSCH.

TABLE 5

| | | PMI Feedback Type | | |
|---|---|---|---|---|
| | | No PMI | Single PMI | Multiple PMI |
| PUSCH CQI feedback type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

The transmission mode of Table 5 may be indicated by the higher layer signal transmitted by the BS, and all of the CQI/PMI/RI may be transmitted from the PUSCH in the same subframe. Modes 1-2, 2-0, 2-2, 3-0, and 3-1 of Table 5 will be described.

(1-1) Mode 1-2

With respect to each subband, a precoding matrix is selected on the assumption that data are transmitted through only the corresponding subband. The UE assumes the selected precoding matrix with respect to the system band or the entire band (referred to as a band set S) assigned by the higher layer signal and generates the CQI.

The UE transmits the CQI and a PMI value of each subband. In this case, a size of each subband may vary according to a size of the system band.

(1-2) Mode 2-0

The UE selects preferable M subbands with respect to a band (band set S) assigned by the system band or the higher layer signal. The UE generates one CQI value on the assumption that the data are transmitted to the selected M subbands. The UE additionally generates one CQI (wideband CQI) value with respect to the system band and the band set S.

In the case where a plurality of codewords is included in the selected M subbands, a CQI value for each codeword is defined as a differential format. A differential CQI may be calculated by an index corresponding to CQI value for the selected M subbands—a wideband CQI index.

The UE transmits information on locations of the selected M subbands, one CQI value for the selected M subbands, and a CQI value generated for the system band or the band set S. In this case, the subband size and the M value may vary according to a size of the system band.

(1-3) Mode 2-2

The UE simultaneously selects locations of M preferable subbands and a single precoding matrix for the M preferable subbands on the assumption that the data is transmitted through the M preferable subbands.

The CQI value for the M preferable subbands is defined for each codeword. The UE additionally generates a wideband CQI value with respect to the system band and the band set S.

The UE transmits information on locations of the M preferable subbands, one CQI value for the selected M subbands, a single precoding matrix index (PMI) for the M preferable subbands, a wideband precoding matrix index, and a wideband CQI value. In this case, the subband size and the M value may vary according to a size of the system band.

(1-4) Mode 3-0

The UE generates a wideband CQI value. The UE generates a CQI value for each subband on the assumption that the data are transmitted through each subband. In this case, even though RI]1, the CQI value represents only the CQI value for the first codeword.

(1-5) Mode 3-1

The UE generates a single precoding matrix with respect to the system band or the band set S. The UE assumes the single precoding matrix generated above and generates the CQI for a subband for each codeword with respect to each subband. The UE assumes the single precoding matrix and may generate the wideband CQI.

The CQI value of each subband is expressed as a differential format. That is, the CQI value may be calculated like the 'subband CQI=subband CQI index–wideband CQI index'. The subband size may vary according to the size of the system band.

[Carrier Aggregation]

Hereinafter, a carrier aggregation system will be described.

Figure 6:
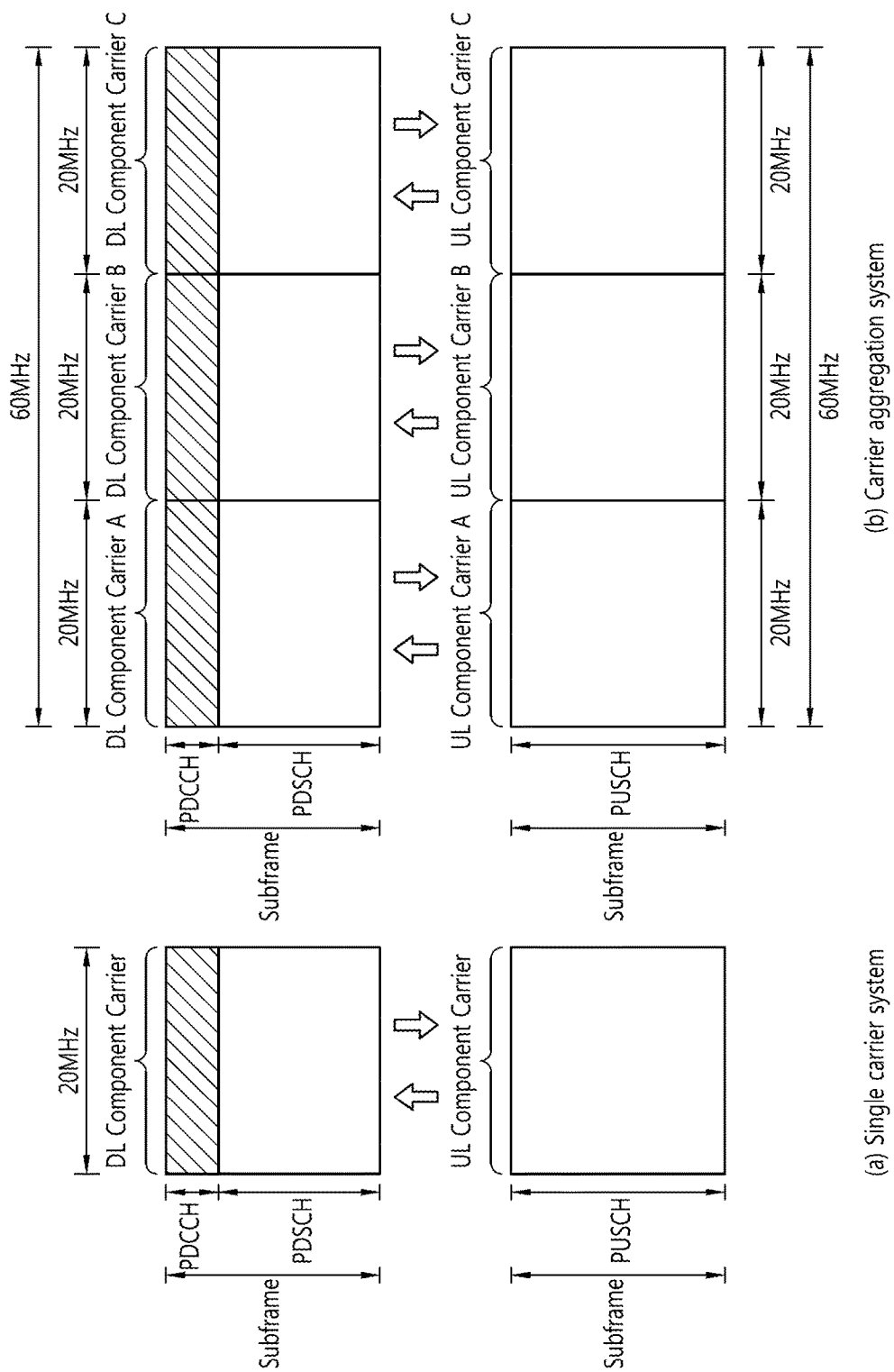
FIGS. 6(a) and 6(b) illustrate a comparative example of a single carrier system in the related art and a carrier aggregation system.

FIG. 6 illustrates a comparative example of a single carrier system in the related art and a carrier aggregation system.

Referring to FIG. 6, in the single carrier system, only one carrier is supported to the UE in the uplink and the downlink. A bandwidth of the carrier may be various, but the number of carriers allocated to the UE is one. On the contrary, in the carrier aggregation (CA) system, a plurality of component carriers DL CCs A to C and UL CCs A to C may be allocated to the UE. A component carrier (CC) means a carrier used in the CA system and may be abbreviated as a carrier. For example, in order to allocate a bandwidth of 60 MHz to the UE, three 20-MHz component carriers may be allocated.

The CA system may be divided into a contiguous CA system in which aggregated carriers are contiguous and a non-contiguous CA system in which the aggregated carriers are separated from each other. Hereinafter, when simply referred to as the CA system, it should be understood that the CA system includes both the system in which the component carriers are contiguous and the system in which the component carriers are not contiguous.

Component carriers to be targeted when one or more component carriers are aggregated may use a bandwidth used in the existing system for backward compatibility with the existing system as it is. For example, in a 3GPP LTE system, bandwidths of 1.4 MHz, 3 MHz, 5 MHz, 10 MHz, 15 MHz, and 20 MHz are supported, and in a 3GPP LTE-A system, a wideband of 20 MHz or more may be configured by using only the bandwidth of the 3GPP LTE system. Alternatively, the wideband may be configured by defining a new bandwidth without using the bandwidth of the existing system as it is.

A system frequency band of the wireless communication system is divided into a plurality of carrier-frequencies. Here, the carrier-frequency means a center frequency of a cell. Hereinafter, the cell may mean a downlink frequency resource and an uplink frequency resource. Further, the cell may mean a combination of the downlink frequency resource and an optional uplink frequency resource. Further, in general, when the carrier aggregation (CA) is not considered, the uplink and downlink frequency resources may continuously exist as a pair in one cell.

In order to transmit and receive packet data through a specific cell, the UE should first complete a configuration for the specific cell. Herein, the configuration means a state in which the reception of the system information required to transmit and receive the data in the corresponding cell is completed. For example, the configuration may include a whole process of receiving common physical layer parameters required to transmit and receive the data, media access control (MAC) layer parameters, or parameters required for a specific operation in an RRC layer. The configured cell is in a state where transmission and reception of the packet are enabled immediately after only information that the packet data may be transmitted is received.

The configured cell may exist in an activation or deactivation state. Here, the activation means that the data is transmitted or received or in a ready state. The UE may monitor or receive a control channel PDCCH and a data channel PDSCH of the activated cell in order to verify a self-allocated resource (frequency, time, and the like).

The deactivation means that transmission or reception of the traffic data is impossible, and measurement or transmission/reception of minimum information is possible. The UE may receive system information (SI) required to receive the packet from the deactivated cell. On the other hand, the UE does not monitor or receive a control channel PDCCH and a data channel PDSCH of the deactivated cell in order to verify the self-allocated resource (frequency, time, and the like).

The cell may be divided into a primary cell, a secondary cell, and a serving cell.

The primary cell means a cell that operates at a primary frequency, and means a cell in which the UE performs an initial connection establishment procedure or a connection reestablishment procedure with the base station, or a cell indicated as the primary cell during a handover procedure.

The secondary cell means a cell that operates at a secondary frequency, and once RRC connection is established, the secondary cell is configured and used to provide an additional radio resource.

The serving cell is configured as the primary cell in the case of an UE in which the CA is not configured or the CA cannot be provided. In the case where the carrier aggregation is configured, the term of the serving cell represents a cell configured to the UE and a plurality of serving cells may be constituted. One serving cell may be configured by a pair of one downlink component carrier or a pair of {downlink component carrier, uplink component carrier}. The plurality of serving cells may be configured by a set of the primary cell and one or a plurality of secondary cells.

A primary component carrier (PCC) means a component carrier (CC) corresponding to the primary cell. The PCC is a CC in which the UE is early connected or RRC-connected with the BS, among many CCs. The PCC is a specific CC that performs connection or RRC-connection for signaling with respect to a plurality of CCs and manages UE context information which is connection information associated with the UE. Further, the PCC is connected with the UE and continuously exists in the activation state in the case of an RRC connected mode. A downlink component carrier corresponding to the primary cell is referred to as a downlink primary component carrier (DL PCC), and an uplink component carrier corresponding to the primary cell is referred to as an uplink primary component carrier (UL PCC).

A secondary component carrier (SCC) means a CC corresponding to the secondary cell. That is, the SCC, as a CC allocated to the UE in addition to the PCC, is an extended carrier for additional resource allocation and the like of the UE in addition to the PCC, and may be divided into activation and deactivation states. A downlink component carrier corresponding to the secondary cell is referred to as a DL secondary CC (DL SCC), and an uplink component carrier corresponding to the secondary cell is referred to as an UL secondary CC (UL SCC).

The primary cell and the secondary cell have the following features.

First, the primary cell is used for transmission of the PUCCH. Second, the primary cell is continuously activated, while the secondary cell is a carrier activated/deactivated according to a specific condition. Third, when the primary cell experiences a radio link failure (hereinafter referred to as an RLF), the RRC-reconnection is triggered. Fourth, the primary cell may be changed by a security key or a handover procedure accompanied with a random access channel (RACH) procedure. Fifth, non-access stratum (NAS) information is received through the primary cell. Sixth, in the FDD system, the primary cell is always constituted by a pair of the DL PCC and the UL PCC. Seventh, a different component carrier (CC) for each UE may be configured as the primary cell. Eighth, the primary cell may be replaced only through handover, cell selection/cell reselection processes. In the addition of a new secondary cell, RRC signaling to transmit system information of a dedicated secondary cell may be used.

In the component carrier constituting the serving cell, the downlink component carrier may constitute one serving cell, and the downlink component carrier and the uplink component carrier are connection-configured to constitute one serving cell. However, the serving cell is not constituted by only one uplink component carrier.

Activation/deactivation of the component carrier is equivalent to, that is, a concept of activation/deactivation of the serving cell. For example, assumed that serving cell 1 is constituted by DL CC1, activation of serving cell 1 means activation of DL CC1. Assumed that serving cell 2 is constituted by connection-configuring DL CC2 and UL CC2, activation of serving cell 2 means activation of DL CC2 and UL CC2. In the meantime, each component carrier may correspond to the serving cell.

The number of component carriers aggregated between the downlink and the uplink may be differently set. A case in which the number of downlink CCs and the number of uplink CCs are the same as each other is referred to as symmetric aggregation, and a case in which the numbers are different from each other is referred to as asymmetric aggregation. Further, sizes (that is, bandwidths) of the CCs may be different from each other. For example, when it is assumed that five CCs are used to configure a 70 MHz-band, the five CCs may be constituted by a 5 MHz CC (carrier #0), a 20 MHz CC (carrier #1), a 20 MHz CC (carrier #2), a 20 MHz CC (carrier #3), and a 5 MHz CC (carrier #4).

As described above, the CA system may support a plurality of component carriers (CCs), that is, a plurality of serving cells, unlike the single carrier system.

The CA system may support cross-carrier scheduling. The cross-carrier scheduling may be a scheduling method that may perform resource allocation of the PDSCH transmitted through other component carriers through the PDCCH transmitted through a specific component carrier and/or resource allocation of the PUSCH transmitted through other component carriers in addition to the component carrier which is basically linked with the specific component carrier. That is, the PDCCH and the PDSCH may be transmitted through different DL CCs, and the PUSCH may be transmitted through another UL CC which is not the UL CC linked with the DL CC transmitted by the PDCCH including a UL grant. As such, in the system supporting the cross-carrier scheduling, a carrier indicator indicating that the PDCCH notifies that the PDSCH/PUSCH providing control information is transmitted through any DL CC/UL CC. A field including the carrier indicator may be hereinafter called a carrier indication field (CIF).

The CA system supporting the cross-carrier scheduling may include a carrier indication field (CIF) in an existing downlink control information (DCI) format. In the system supporting the cross-carrier scheduling, for example, the LTE-A system, since the CIF is added to the existing DCI format (that is, the DCI format used in the LTE), 3 bits may be extended, and the PDCCH structure may reuse an existing coding method, a resource allocating method (that is, resource mapping based on the CCE), and the like.

The BS may configure a PDCCH monitoring DL CC (monitoring CC) set. The PDCCH monitoring DL CC set is configured by some DL CCs among all the aggregated DL CCs, and when the cross-carrier scheduling is configured, the UE may perform PDCCH monitoring/decoding with respect to only the DL CC included in the PDCCH monitoring DL CC set. In other words, the BS transmits the PDCCH for the PDSCH/PUSCH to be scheduled through only the DL CC included in the PDCCH monitoring DL CC set. The PDCCH monitoring DL CC set may be set UE-specifically, UE group-specifically, or cell-specifically.

Hereinafter, the present invention will be described.

In LTE-A, like the aforementioned CA system, a plurality of serving cells may be allocated to the UE. In this case, the BS may independently configure a periodic CSI reporting mode (hereinafter, may be abbreviated as a CSI reporting mode), a periodic CSI reporting period (may be abbreviated as a CSI reporting period), and the like so that the UE may report channel state information for the downlink channel state for each serving cell, that is, the channel state information (CSI).

In this case, in the same UL subframe, transmission of a plurality of CSI types for the plurality of cells may be configured, and this is expressed as CSI collision. During the CSI collision, the UE may transmit only one CSI type and drop the remaining CSI according to a priority.

First, a priority in the related art applied during the CSI collision will be described.

[Priority of CSI on the Same Cell]

When a CSI report of a CSI type 3, 5, or 6 for one serving cell and a CSI report of a CSI type 1, 1a, 2, 2a, 2b, 2c, or 4 for one serving cell collide with each other, the CSI report of the CSI type 1, 1a, 2, 2a, 2b, 2c, or 4 has a low priority and is dropped.

The remaining CSI types except for RI series (that is, CSI type 3, 5, 6) are transmitted at a multiple interval of $N_{pd}$, while the RI series are separately set in a subframe which is not the multiple of $N_{pd}$ by using $N_{offset,RI}$. If $N_{offset,RI}=0$, the CSI types may collide with other CSI types, and during the collision, the CSI type having a lower priority than the RI series is dropped.

[Priority for CSI of Different Cells]

First rule: When two or more serving cells are configured for the UE, the UE performs only CSI reporting for only one serving cell in a given subframe. The CSI report which is the CSI type 3, 5, 6, or 2a of a first cell and the CSI report which is the CSI type 1, 1a, 2, 2a, 2b, 2c, or 4 of a second cell may collide with each other in the given subframe. In this case, the CSI report which is the CSI type 1, 1a, 2, 2a, 2b, 2c, or 4 has the low priority and is dropped.

A CSI report which is CSI type 2, 2b, 2c, or 4 of the first cell and a CSI report which is CSI type 1 or 1a of the second cell may collide with each other in the given subframe. In this case, the CSI report which is the CSI type 1 or 1a has the low priority and is dropped. The first cell and the second cell are different cells.

Second rule: CSI reports of the CSI types having the same priority in different serving cells may collide with each other in the given subframe. In this case, a CSI of a serving cell having the lowest serving cell index ServCellIndex is reported, and many pieces of CSI of all other serving cells are dropped.

According to the related art, during CSI period collision of the plurality of serving cells, the UE selects and transmits only the CSI on one serving cell and drops the remaining CSI. Further, in an existing method, when the UL ACK/NACK transmission for the PDSCH and the periodic CSI transmission collide with each other, there is a rule that the periodic CSI is dropped, and in the related art, an effect of the periodic CSI reporting is reduced, and the loss of system throughput is caused. Particularly, in the TDD system in which the number of UL subframes is limited, the problem may be more serious.

Accordingly, in a future wireless communication system, when the CSI transmissions for the plurality of serving cells collide with each other in one UL subframe, it is considered that many pieces of CSI on the plurality of serving cells are simultaneously transmitted. Hereinafter, many pieces of periodic CSI on the plurality of serving cells are called multiple pieces of CSI (mCSI). For easy description, a reporting target of the mCSI is represented as the serving cell (in more detail, DL CC included in the serving cell), but is not limited thereto. That is, the reporting target of the mCSI is not limited to the DL CC, and may include all targets having different channel characteristics to perform different reportings. For example, the reporting target of the mCSI may be a plurality of transmission nodes (referred to as points) in coordination communication and divided by varying CSI processes for measuring the CSI. The CSI process may be configured by one or more CSI-RSs and interference measurement resources (IMR). Each CSI process may have an identity (ID) and may be divided by the ID.

Periodic reporting of the mCSI may be transmitted to the PUCCH or the PUSCH. When the plurality of many pieces of CSI is used, the PUCCH format 3 may be used.

Meanwhile, in the LTE-A, PUCCH format 3 is introduced in order to transmit a UCI (the ACK/NACK and the SR) of maximum 21 bits (represent the bit number before channel coding as information bits and maximum 22 bits when the SR is included). The PUCCH format 3 uses the QPSK as the modulation method, and a bit number which is transmittable in the subframe is 48 bits (represent a bit number transmitted after the information bits are channel-coded).

The PUCCH format 3 performs block spreading based transmission. That is, a modulated symbol sequence that modulates a multi-bit ACK/NACK by using a block spreading code is spread and thereafter, transmitted in the time domain.

Figure 7:
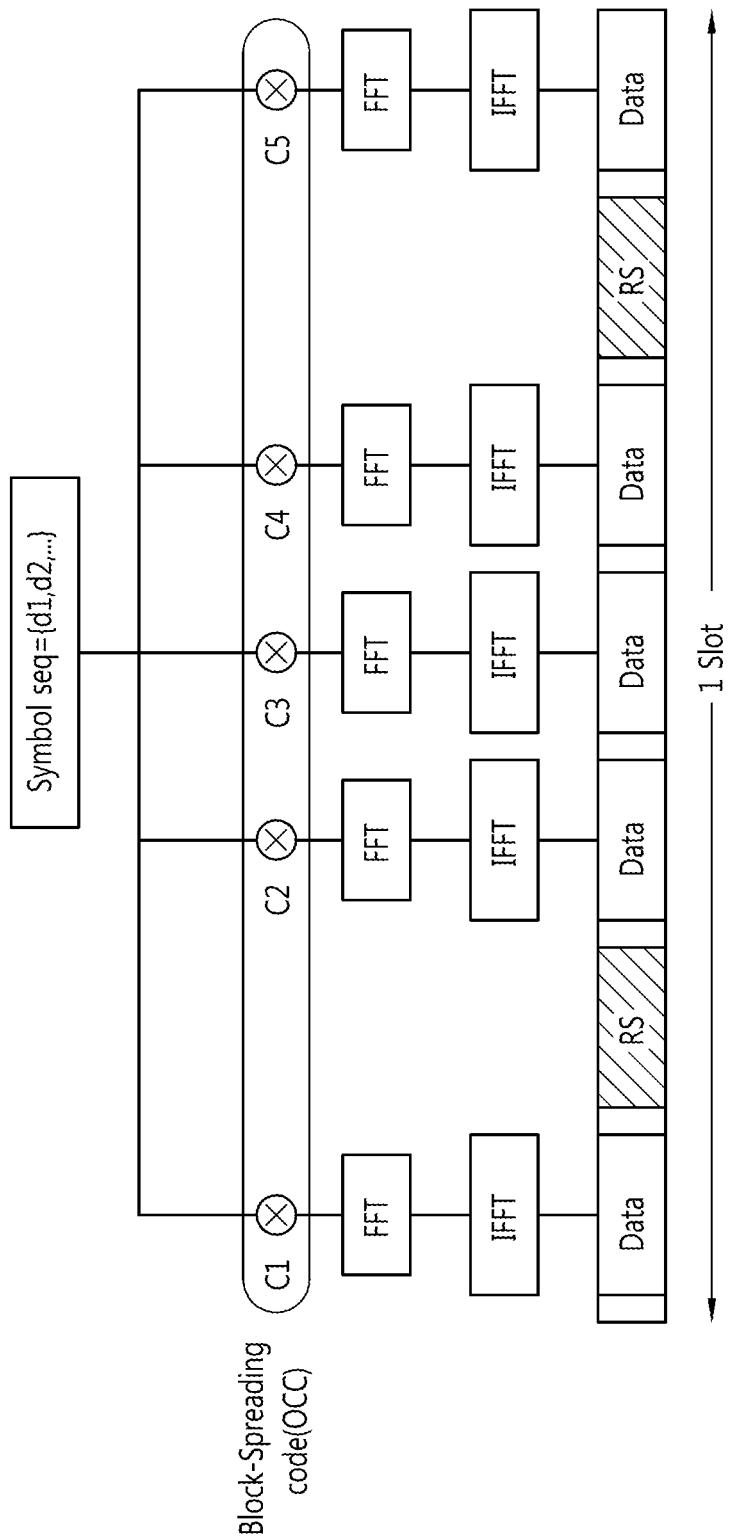
FIG. 7 exemplifies a channel structure of a PUCCH format 3.

FIG. 7 exemplifies a channel structure of PUCCH format 3.

Referring to FIG. 7, a modulated symbol sequence {d1, d2, ... } to which the block spreading code is spread in the time domain. The block spreading code may be an orthogonal cover code (OCC). Herein, the modulated symbol sequence may be a sequence of the modulated symbols in which the ACK/NACK information bits which are multiple bits are channel-coded (using the RM code, a TBCC, a punctured RM code, and the like) to generate ACK/NACK coded bits, and may be a sequence of modulated symbols in which the ACK/NACK coded bits are modulated (for example, QPSK-modulated). The sequence of the modulated symbols is mapped in data symbols of the slot through fast Fourier transform (FFT) and inverse fast Fourier transform (IFFT) and thereafter, transmitted. FIG. 6 exemplifies a case in which two RS symbols exist in one slot, but three RS symbols may exist and in this case, a block spreading code having a length of 4 may be used.

Meanwhile, the PUSCH transmission may be divided into transmission by the dynamic scheduling and other transmissions. The PUSCH transmission by the dynamic scheduling may be, for example, PUSCH transmission scheduled by the UL grant, first PUSCH transmission scheduled by the SPS activation/deactivation PDCCH, or the like.

In the PUSCH transmission without dynamic scheduling, a method of allocating and transmitting a PUSCH resource semi-statically without the UL grant such as the SPS, a method of transmitting a periodic PUSCH by assigning the PUSCH resource to the RRC, or the like is included. As such, in the case of the periodically configured resource, frequency selective scheduling is not suitable, and transmission using frequency diversity is more suitable.

In order to obtain the frequency diversity, it is required that the transmission RB is dispersed and allocated in the frequency domain. In the case of the existing PUSCH resource allocation, in order to obtain the frequency diversity, frequency hopping may be applied. However, when the frequency hopping is applied to the periodically configured resource, there is a disadvantage in that complexity is increased in frequency selective scheduling and multiplexing. Accordingly, in the periodic PUSCH resource allocation, a resource allocation method in which a frequency interval is maximally ensured by using both ends of the given frequency band may be introduced.

For example, in the case of allocating the periodic PUSCH resource by RRC signaling, the BS may transmit information on PUSCH resource block allocation according to a period of the PUSCH and the bit number of CSI. The information on resource block allocation may be implemented by a form in which starting points of the RB and the number of RBs are indicated.

During the PUSCH RB allocation, like the PUCCH, an RB index may be constituted by slot-hopping both ends of the band.

Figure 8:
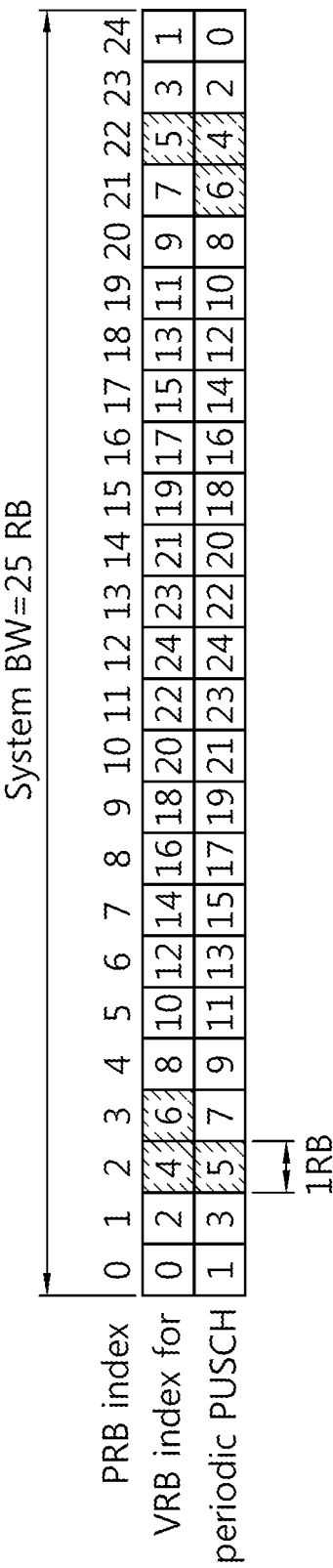
FIG. 8 illustrates an example of configuring an RB index when a periodic PUSCH resource is allocated.

FIG. 8 illustrates an example of configuring an RB index when a periodic PUSCH resource is allocated.

Referring to FIG. 8, the RB index may be constituted by slot-hopping both ends of the band. For example, when the system band is constituted by 25 RBs, a RB start index may be 4 and the number of RBs may be 3. The RB start index and the number of RBs may be implemented by a resource indication value (RIV) included in the DCI format. The number of PUSCHs may be limitatively used due to limitation of the bit number of the CSI, and an RB allocation bit field may be constituted by limiting a maximum number of RBs.

The RB allocation may use resource allocation applied to a DCI format 1A. The resource allocation may use two VRB types based on a localized virtual resource block (LVRB) indicator and a distributed virtual resource block (DVRB) indicator. Alternatively, when the indicators are not included, the resource allocation is mapped in the PRB by the DVRB.

In the case of using the DVRB, a gap indication field (1 bit) may be added according to the system band. The gap value may be indicated as one of two values. When the corresponding field does not exist, it is recognized that the first gap is applied.

It is assumed that a maximum number limit of RBs of the periodic PUSCH resource is $L_{max}$. A length of the RB allocation bit field using RIV equation may be determined as the following Equation. When a plurality of PUSCH RBs are not required because an information amount of the CSI simultaneously transmitted is small, $L_{max}$ may be fixed as 1.

$$b = \lceil \log_2(N_{RB}^{DL} \cdot (N_{RB}^{DL} + 1)/2 - (N_{RB}^{DL} - L_{max}) \cdot \quad \text{[Equation 7]}$$
$$(N_{RB}^{DL} - L_{max} + 1)/2) \rceil$$
$$= \lceil \log_2(N_{RB}^{DL} L_{max} - L_{max} \cdot (L_{max} - 1)/2) \rceil$$

$N_{RB}^{DL}$ represents the number of RBs in the downlink band.

Meanwhile, the DL CC which is a target of the multiple pieces of CSI transmitted to the scheduled PUSCH or PUCCH may be all activation DL CCs in which the periodic CSI reporting mode is set and an activation DL CC which is set to the RRC. In this case, a single DL CC is not excluded.

Figure 9:
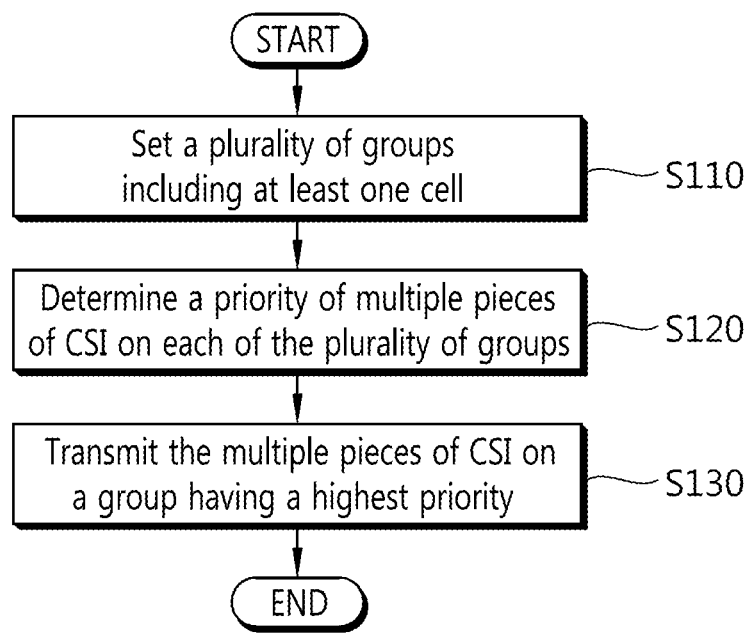
FIG. 9 illustrates a method of transmitting a periodic CSI according to an embodiment of the present invention. Hereinafter, the CSI illustrates a periodic CSI.

FIG. 9 illustrates a method for transmitting periodic CSI according to an embodiment of the present invention. Hereinafter, the CSI represents periodic CSI.

Referring to FIG. 9, the UE configures a plurality of groups including at least one cell (S110). The UE may receive cells included in each group through an RRC message.

Alternatively, the UE and the BS may share rules for cells configuring the group. In this case, the UE may configure cells constituting the group without separate signaling. For example, the cells in one group may be cells having the same CSI transmission period or cells in which the CSI transmission periods have a multiple relationship between the cells.

Alternatively, the cells in one group may be cells having the same transmission mode. That is, each group may be divided based on the transmission modes of the cells.

Alternatively, each group may be configured based on a CSI reporting mode, a downlink bandwidth, or whether the cells are included in the CoMP or not.

The grouping is to consider that a CSI reporting mode required for each transmission mode varies and a transmission period for each CSI reporting mode and a CSI reporting type in each transmission period vary. That is, grouping cells having similar features is efficient to the CSI feedback. The UE may configure a plurality of groups by using any reference among the aforementioned various references.

The UE determines a priority of the multiple pieces of CSI on each of the plurality of groups. The priority will be described in detail.

The UE feeds-back the multiple pieces of CSI of the group having a highest priority to the BS (S130).

[During Grouping, CSI Collision Rule Between Groups]

Hereinafter, a priority of each group will be described.

When the multiple pieces of CSI transmissions for each group collide with each other in the same subframe, it is necessary that only the multiple pieces of CSI on one group is selectively transmitted, and the multiple pieces of CSI of the remaining non-selected groups is dropped. This is because there is a limitation on a payload that may be transmitted in the transmission channel, for example, the PUCCH or PUSCH.

In this case, there is a need to determine which group among the plurality of groups is selected, that is, a priority between the groups.

1. Method 1

Method 1 is a method of granting a highest priority to a group having the smallest carrier index (CI) value among target DL CCs of the CSI generated in a CSI transmission subframe. The CI means a cell index in a physical layer allocated for each cell.

Figure 10:
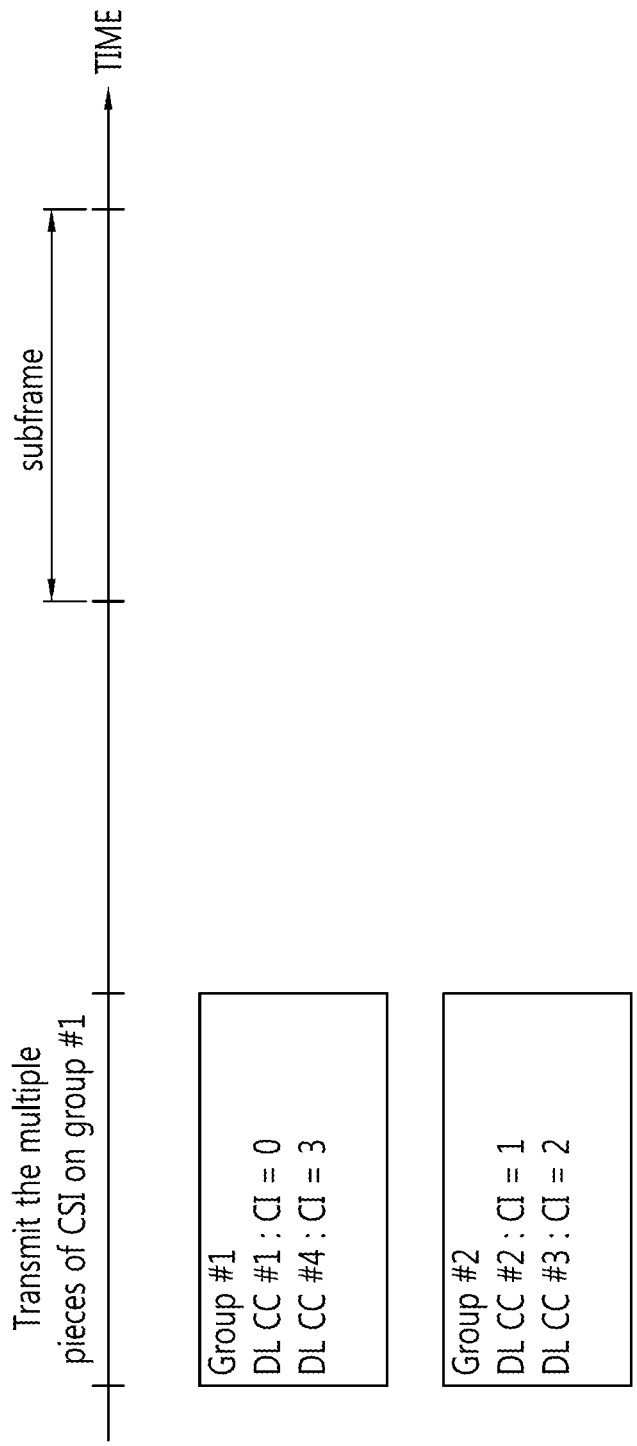
FIG. 10 exemplifies method 1.

FIG. 10 exemplifies Method 1.

Referring to FIG. 10, it is assumed that DL CCs #1 to #4 are configured in the UE. It is assumed that group #1 includes DL CC #1 (CI=0) and DL CC #4 (CI=3), and group #2 includes DL CC #2 (CI=1) and DL CC #3 (CI=2). In this case, in a subframe configured to transmit the CSI, multiple pieces of CSI transmissions for the groups #1 and #2 may collide with each other.

In this case, a group including a DL CC (that is, DL CC #1) having the smallest CI value of the groups #1 and #2 is the group #1. Accordingly, since the priority of the group #1 is highest, the UE transmits the multiple pieces of CSI on the group #1.

In the method 1, a relationship between the number of the DL CC and the CI value is just exemplified for easy description (hereinafter, it is the same).

2. Method 2

Method 2 is a method in which a group having a minimum CI value in the group has a highest priority but a target comparing the CI value is limited to activation DL CCs. That is, in the method 1, the CI values of the DL CCs of each group are compared with each other without driving the activation DL CCs and the deactivation DL CCs, but in the method 2, there is a difference in that the CI values are compared with each other only in the activation DL CCs.

Figure 11:
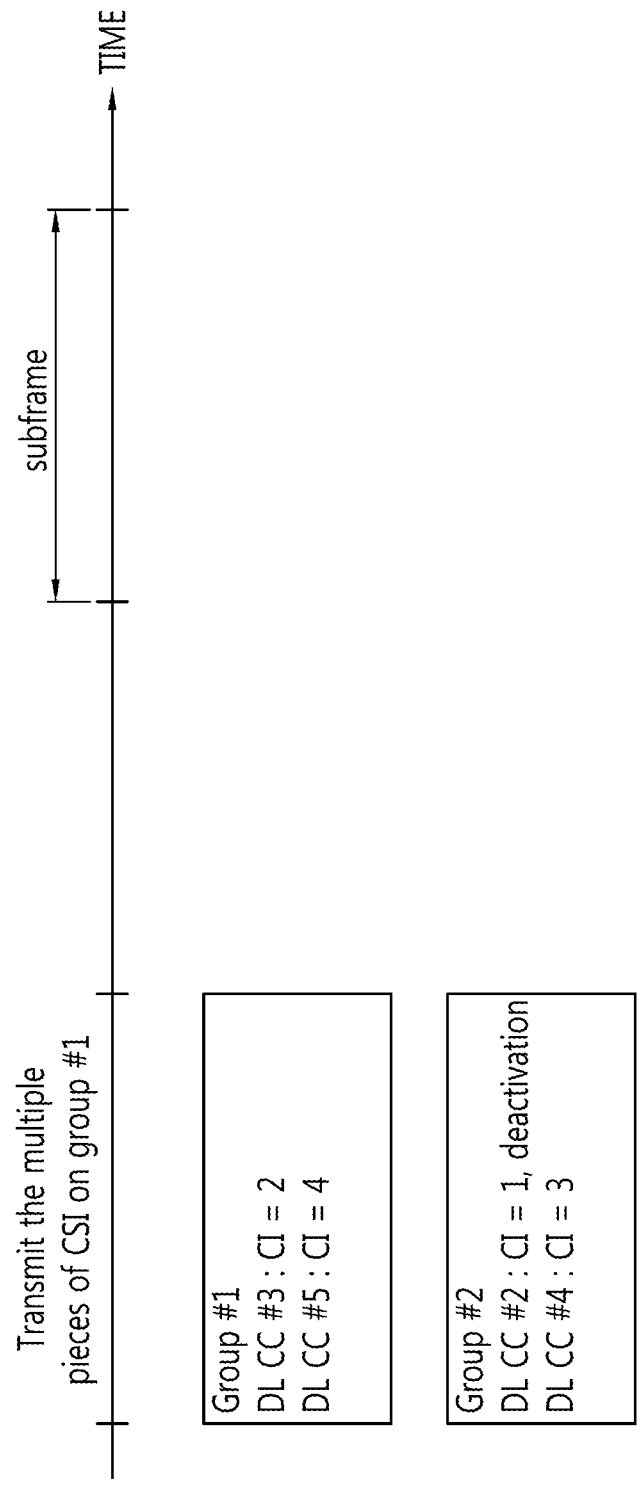
FIG. 11 exemplifies method 2.

FIG. 11 exemplifies method 2.

Referring to FIG. 11, it is assumed that DL CCs #2 to #5 are configured in the UE. It is assumed that group #1 includes DL CC #3 (CI=2) and DL CC #5 (CI=4), and group #2 includes DL CC #2 (CI=1) and DL CC #4 (CI=3). In this case, it is assumed that the DL CC #2 is a deactivation DL CC and the remaining DL CCs are activation DL CCs. In a subframe configured to transmit the CSI, multiple pieces of CSI transmissions for the groups #1 and #2 may collide with each other.

In this case, when only the CI values of the activation DL CCs are compared with each other in the groups #1 and #2, a group including a DL CC (that is, DL CC #3) having the smallest CI value of the groups #3 and #2 is the group #1. Accordingly, since the priority of the group #1 is highest, the UE transmits the multiple pieces of CSI on the group #1.

3. Method 3

A reporting type having a highest priority in each group which collides with each other in a CSI transmission subframe becomes a representative type of each group. The method 3 is a method in which a group having a highest priority is selected by comparing representative types of each group. That is, a group including a reporting type having a highest priority among the reporting types to be transmitted in the same subframe has a highest priority.

Figure 12:
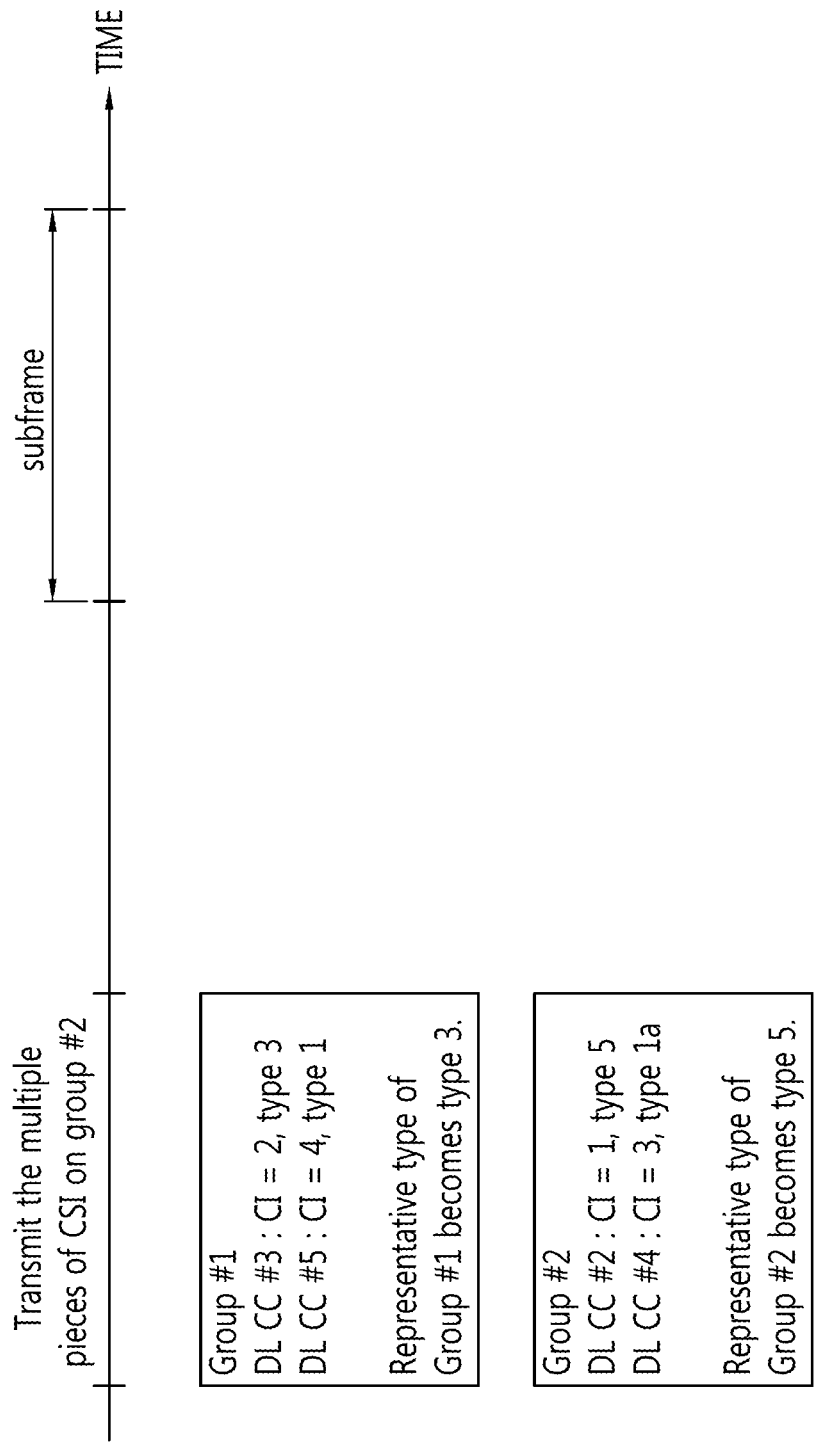
FIG. 12 exemplifies method 3.

FIG. 12 exemplifies method 3.

Referring to FIG. 12, it is assumed that DL CCs #2 to #5 are configured in the UE. It is assumed that group #1 includes DL CC #3 (CI=2, type 3) and DL CC #5 (CI=4, type 1) and group #2 includes DL CC #2 (CI=1, type 5) and DL CC #4 (CI=3, type 1a). In a subframe configured to transmit the CSI, multiple pieces of CSI transmissions for the groups

1 and #2 may collide with each other. In the example, the type represents the aforementioned CSI reporting type.

In this case, first, a 'first rule' of the aforementioned "the priority for the CSI of different cells" for each group is applied. Then, a representative type of the group #1 is type 3 and a representative type of the group #2 is type 5.

When the 'first rule' is applied to the representative type of each group again, a priority of the type 5 is high. Accordingly, the UE transmits the multiple pieces of CSI on the group #2.

4. Method 4

Method 4 is a method in which a group having the most number of DL CCs (cells) in a group has a highest priority.

5. Method 5

Method 5 is a method in which a group having the most number of DL CCs which are a target of the CSI generated in a CSI transmission subframe (alternatively, reversely a group having the least number of DL CCs) has a highest priority.

6. Method 6

Method 6 is a method in which a group of which a total sum of the bit number of the CSI generated in the CSI transmission subframe is the largest (alternatively, the smallest) has the higher priority.

7. Method 7

Method 7 is a method of following a priority of CSI of each group configured by signaling (for example, RRC).

8. Method 8

Method 8 is a method in which a group having the smallest CI of a CoMP serving cell among target DL CCs of the CSI generated in the corresponding CSI transmission subframe has a highest priority when the grouping is performed based on a CoMP set. The CoMP serving cell will be described below.

9. Method 9

Method 9 is a method in which a group having the smallest CI of the CoMP serving cell among DL CCs in a group has a highest priority when the grouping is performed based on a CoMP set and a comparison target of the CI values is limited to the activation DL CC.

Among the aforementioned methods, a case where different groups have the same priority may occur. For example, in the method 3, groups having the same priority may be generated. In this case, by comparing CIs of the target DL CC of the representative type of the corresponding group, that is, the targeted DL CC of the representative type, a group including the DL CC having the lowest CI value may be selected.

Further, for example, when the aforementioned methods 4 to 7 are applied, two or more groups may have the same priority. In this case, the aforementioned methods 3, 2, and 1 may be additionally applied. When two or more groups have the same priority even though the method 3 is applied, the methods 2, 1, 8, and 9 may be additionally applied. When the methods 3, 2, and 1 are additionally applied, the target may be limited to the groups having the same priority.

[CSI Collision Rule in the Same Group]

When it is difficult to transmit all many pieces of CSI (multiple pieces of CSI) for the same group, an existing CSI collision rule may be followed or the following rule may be applied.

A payload arrangement of many pieces of CSI in the same group may be in the order of 1) CIs of the CSI target DL CC. That is, the order may be arranged from the CSI on the DL CC having a low CI in the LSB. In the case of CSI of the CoMP set, the arrangement order may be determined by using a CSI process, and in this case, may be determined based on a process identity (PI) instead of the CI. In the case of the same PI, the arrangement order may be determined by the CI. Alternatively, 2) a payload arrangement order of the many pieces of CSI in the same group may be determined according to a priority. For example, the CSI having a high priority is arranged in the LSB.

When the ACK/NACK and the CSI are multiplexed or transmitted at a PUCCH format 3 or many pieces of CSI on the plurality of DL CCs are multiplexed or transmitted at the PUCCH format 3, some pieces of CSI may be dropped according to the bit number (payload number tranmittable at the PUCCH format 3.

The limitation of the payload number is determined by a BS set value Y and the like by considering a ACK/NACK bit number when the ACK/NACK is joint-coded, SR bits S when the SR bits are joint-coded in the SR subframe, a location of the UE, and the like, and may be determined as $C=\min(X,Y)-N-S$.

Hereinafter, a method of determining a priority during collision between many pieces of CSI on the plurality of cells (DL CCs) in the same group will be described. The transmission of the CSI is performed in order of a higher priority, and when all the many pieces of CSI can not be transmitted, the CSI having a low priority is dropped.

When the many pieces of CSI on the plurality of cells in the same group collide with each other in the same subframe (for example, when $N_{OFFSET,RI}=0$), according to an existing method, first, after the many pieces of CSI on each cell are determined by applying the "priority of the many pieces of CSI on the same cell', the "priority for the many pieces of CSI of different cells" is applied to the many pieces of CSI on each cell. According to the existing method, the wideband PMI, the wideband CQI, and the like which have lower priorities than RI series are almost dropped. This is inefficient.

In the present invention, the "priority of the many pieces of CSI on the same cell' is first not applied, and the "priority for the many pieces of CSI of different cells" is first applied to the many pieces of CSI on all the cells in the same group. Thereafter, the "priority of the many pieces of CSI on the same cell' is applied. That is, in comparison with the existing method, applying orders of the "priority of the many pieces of CSI on the same cell' and the "priority for the many pieces of CSI of different cells" are different from each other. This will be described in detail.

First Embodiment

First step: First, the following priority is applied to the CSI on each of all of the cells included in one group. The priority of the CSI may be 1) first priority: types 3, 5, 6, and 2a, 2) second priority: types 2, 2b, 2c, and 4, and 3) third priority: types 1 and 1a.

Second step: In the case of having the same priority in step 1, CSI on a cell (DL CC) having a low CI has a higher priority.

Third step: in the case of having the same priority in step 2, the following priority may be applied. 1) types 3, 5, and 6 and 2) types 2a, 2, 2b, 2c, 4, 1, and 1a.

For example, when cells #0 to 2 are included in one group and type 3 and type 2 in the cell #0, type 1 in the cell #1, and type 2a in the cell #2 are configured, the priority order becomes the cell #0 type 3, the cell #2 type 2a, the cell #0 type 2, and the cell #1 type 1.

Meanwhile, in the first to third steps, the CSI transmissions for the same cell having different process IDs may collide with each other in the same UL subframe. In this case, when the priorities of the many pieces of CSI which collide with each other are the same as each other, the priority may be divided based on the ID of the process of transmitting each CSI. When the ID of the process of transmitting each CSI is not allocated, it is assumed that the priority has a minimum value. This process may be positioned before the second step.

Meanwhile, in the steps 1 to 3, a case where CSI reporting for two or more CSI subframe sets of one cell is configured to the UE and the priorities of many pieces of CSI on two or more CSI subframe sets (for example, a first subframe set and a second subframe set) are the same as each other may occur. In this case, the CSI of the first subframe set may have a higher priority than the CSI of the second subframe set. This process may be positioned between the second step and the third step.

Second Embodiment

Figure 13:
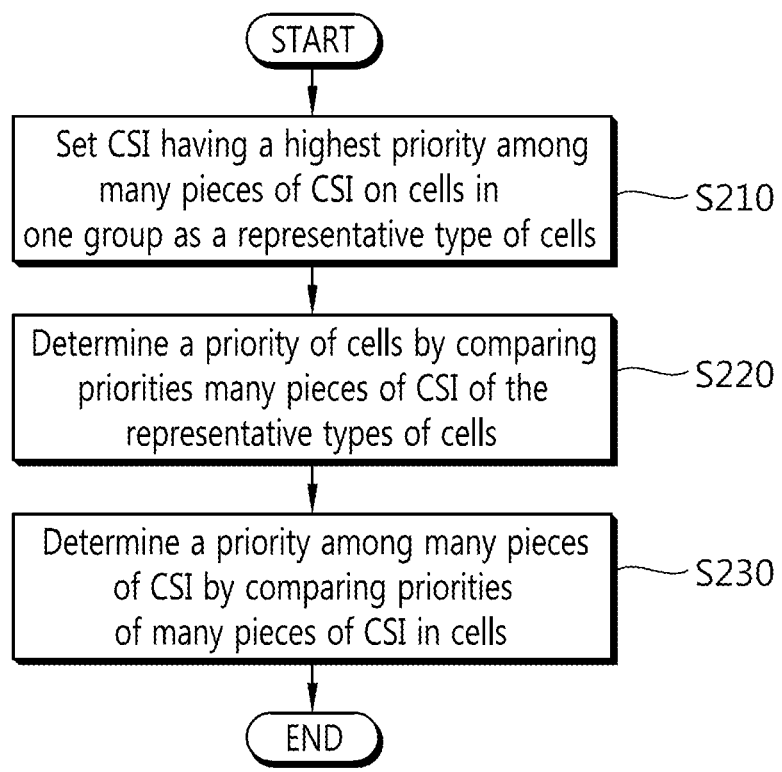
FIG. 13 illustrates a method of determining a priority between many pieces of CSI of a plurality of cells in the same group according to a second embodiment of the present invention.

FIG. 13 illustrates a method of determining a priority between many pieces of CSI of a plurality of cells in the same group according to a second embodiment of the present invention.

Referring to FIG. 13, first, a type having a highest priority among many pieces of CSI on cells in the same group is set as a representative type (S210). In this case, the aforementioned "priority of the many pieces of CSI on the same cell" is applied. That is, among the many pieces of CSI one cell to be transmitted in the UL subframe, a first priority is type 3, 5, 6, and a second priority is type 2a, 2, 2b, 2c, 4, 1, 1a. Representative types for each cell may be determined through the process.

Thereafter, the priority of each cell is determined by comparing a priority of the CSI of the representative type of each cell with a priority of the CSI of the representative type of another cell.

Meanwhile, the many pieces of CSI of the representative types of different cells may have the same priority. For example, when the representative type of cell #1 is type 3 and the representative type of cell #2 is type 5, the representative types have the same priority. In this case, a higher priority may be granted to a cell having a lower CI value by comparing CIs of the cells #1 and 2.

In each cell of which the priority is determined, priorities of the many pieces of CSI may be determined by applying the "priority of the many pieces of CSI on the same cell" again (S230).

Figure 14:
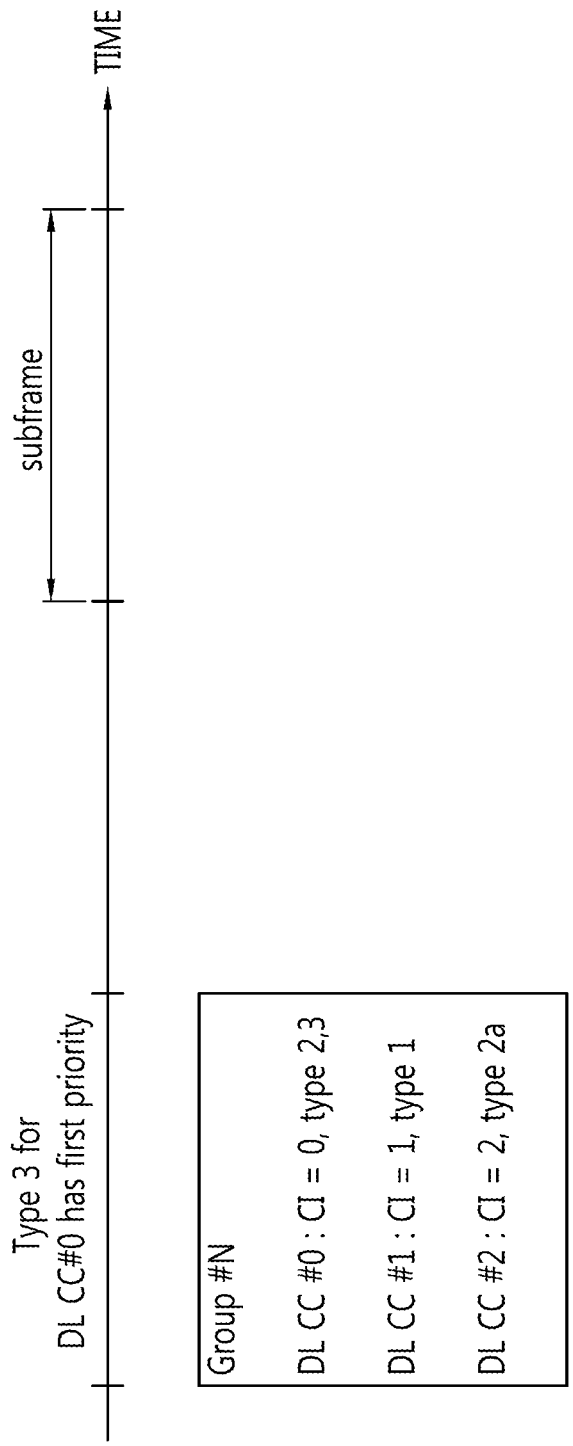
FIG. 14 illustrates an example of determining a priority when CSI transmissions for a plurality of cells in one group collide with each other according to the second embodiment.

FIG. 14 illustrates an example of determining a priority when CSI transmissions for a plurality of cells in one group collide with each other according to the second embodiment. However, each cell is represented by the DL CC in more detail.

Referring to FIG. 14, DL CCs #0(CI=0), #1(CI=1) and #2(CI=2) are included in group # N and type 3 of the DL CC #0, type 2 of the DL CC #0, type 1 of the DL CC #1, and type 2a of the DL CC #2 collide with each other in the same subframe, the priorities become type 3 of the DL CC #0, type 2 of the DL CC #0, type 2a of the DL CC #2 and type 1 of the DL CC #1 according to the second embodiment.

Meanwhile, in the second embodiment, the CSI transmissions for the same cell having different process IDs may collide with each other in the same UL subframe. In this case, when the priorities of the many pieces of CSI which collide with each other are the same as each other, the priority may be divided based on the ID of the process of transmitting each CSI. When the ID of the process of transmitting each CSI is not allocated, it is assumed that the priority has a minimum value. This process may be positioned before the second step.

Meanwhile, in the second embodiment, a case where CSI reporting for two or more CSI subframe sets of one cell is configured to the UE and the priorities of the CSI on two or more CSI subframe sets (for example, a first subframe set and a second subframe set) are the same as each other may occur. In this case, the CSI of the first subframe set may have a higher priority than the CSI of the second subframe set.

[CSI Collision Rule for CoMP Set in Group]

In a future wireless communication system, cooperative multi-point transmission/reception (CoMP) may be implemented by using carrier aggregation. Hereinafter, a CoMP system will be described, and when cells performing the CoMP are included in the same group, a method of determining priorities of many pieces of CSI of the cells will be described.

Figure 15:
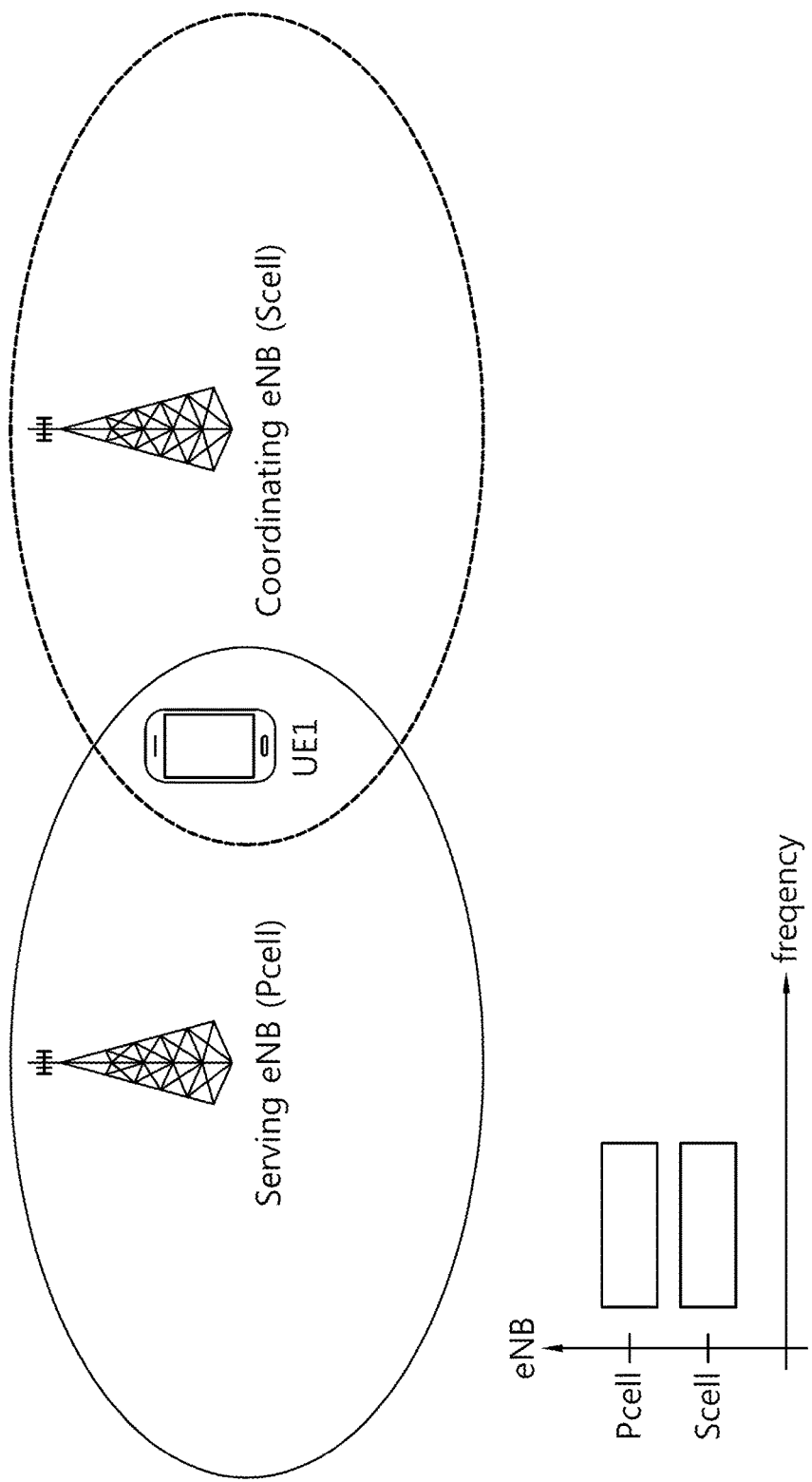
FIG. 15 exemplifies a CoMP system using carrier aggregation.

FIG. 15 exemplifies a CoMP system using carrier aggregation.

Referring to FIG. 15, the CoMP system may include a serving eNB and a coordinating eNB which are geographically separated from each other. A frequency used in the serving eNB may be referred to as a primary cell (Pcell) carrier, and a frequency used in the coordinating eNB may be referred to as a secondary cell (Scell) carrier. In this case, the Pcell carrier and the Scell carrier may use the same frequency band.

The serving eNB and the coordinating eNB may perform various known DL/UL CoMP operations such as joint transmission (JT), coordinated scheduling (CS)/coordinated beamforming (CB), and dynamic cell selection.

FIG. 15 illustrates an example in which two eNBs (alternatively, two sectors of one eNB are aggregated as a CoMP Pcell and a CoMP Scell in one UE. The present invention is not limited thereto, and three or more cells are aggregated in one UE, some cells thereof may CoMP-operate in the same frequency band, and other cells may simply CA-operate in different frequency bands. In this case, the Pcell needs not to take part in the CoMP operation. Further, the CoMP operation is generally performed in the same frequency band, but in the case of dynamic cell selection, the CoMP operation may be performed between different frequency bands of different eNBs.

The Pcell is one specific cell among serving cells which are carrier-aggregated, and may be a cell with which the UE is first RRC-connected. Further, the Pcell is a cell in which the UE receives a physical channel for obtaining main system information such as a PBCH and a PDCCH in a common search space through the downlink, and may transmit the PUCCH transporting ACK/NACK, CSI, and the like through an uplink of the Pcell. The Scell means cells which are not the Pcell among the cells which are carrier-aggregated. This was described in detail in the carrier aggregation.

A CoMP set means cells to which CoMP operation is applied, among the cells which are carrier-aggregated by the UE. The cells to which CoMP operation is applied indicate only cells which currently take part in signaling for the CoMP such as joint transmission (JT), dynamic cell selection (DCS), coordinated beam forming (CB), and coordinated scheduling (CS) and transmission/reception, or may include all cells that are candidates to take part therein. For the CoMP operation, target cells to measure the CSI are called a CoMP measurement set.

CoMP cell: means cells which belong to the CoMP set.

CoMP primary cell (Pcell): One specific cell among the cells which belong to the CoMP set is called the CoMP Pcell.

The CoMP Pcell may be the same as the Pcell. Alternatively, the CoMP Pcell may be set as a cell which is not the Pcell through RRC signaling.

The CoMP Pcell may be a cell transmitting the PDCCH which schedules PDSCH/PUSCH transmission for CoMP cells, when cross-carrier scheduling is applied in the CoMP set.

The CoMP Scell is called a cell which is not the CoMP PCell among the CoMP cells.

New Carrier Type (NCT): Even in the case where an existing carrier is singly used, since access of the UE is possible, system information, a synchronization channel, a common reference signal, a common control channel exist. However, after the RRC connection, when the specific carrier is used as the Scell, the aforementioned common reference signal, the common control channel, and the like may be unnecessary in the specific carrier. Nevertheless, including the common reference signal, the common control channel, and the like may be a limitation on efficient usage of the frequency resource. Accordingly, in the future wireless communication system, a NCT which can not be recognized by legacy UEs is used, but it is considered that the NCT is used as the Scell. The NCT is also called an extension carrier. Since the NCT may be used as only the Scell, unnecessary elements may be reduced as compared with a case where the existing carrier is used as the Scell, and thus the cells may be more efficiently configured.

In the downlink, when the CoMP is configured to the UE and the UE needs to transmits the CSI on the CoMP set, a method of determining a priority will be described. That is, a plurality of CoMP sets may be configured in the same group. In this case, when many pieces of CSI on the cells included in the same CoMP set and many pieces of CSI on the cells included in different CoMP sets collide with each other, the method of determining a priority will be described. Here, the cells included in the same CoMP set mean a set of cells performing CoMP in the same frequency band. Only one cell may also exist in the CoMP set.

First, the many pieces of CSI on the cells included in one CoMP set may have the same priority. Thereafter, the priorities of the many pieces of CSI of each CoMP set are determined. Next, the priorities for each CSI of the many pieces of CSI in each CoMP set are determined again. The transmission of the CSI is performed in order of a higher priority, and when all the many pieces of CSI can not be transmitted, some pieces of CSI having low priorities are dropped.

Hereinafter, a detailed example of the method of determining priorities for the many pieces of CSI of each CoMP set will be described.

1. The many pieces of CSI of the CoMP set including a DL CC having the smallest CI value among DL CCs which are targets of the CSI of the same CoMP set generated in the CSI transmission subframe have a highest priority.

2. The CSI of the CoMP set having the smallest CI value among DL CCs in the same CoMP set has a highest priority, and the DL CCs are limited to the activation DL CCs.

3. A reporting type having a highest priority in each CoMP set generated in a CSI transmission subframe becomes a representative type of each CoMP set. By comparing the representative values, the many pieces of CSI on cells of the CoMP set including the reporting type having a highest priority have a highest priority. In other words, the CSI on the CoMP set including the reporting type having a highest priority among reporting types to be transmitted in the CSI transmission subframe has a highest priority.

4. The CSI on the CoMP set in which the number of DL CCs is most in the CoMP set has a highest priority.

5. The CSI on the CoMP set having the most number of DL CCs which are targets of the CSI in the CSI transmission subframe has a highest priority.

6. The CSI on the CoMP set having the most total sum of bit numbers of the CSI in the CSI transmission subframe has a highest priority.

7. The priority set by signaling in advance for each CoMP set is followed.

8. The many pieces of CSI on the CoMP set which collide with each other in the CSI transmission subframe have a large possibility to be configured as the same reporting type. Accordingly, when the CIs of cells included in the same CoMP set are set as adjacent values, the priority may be determined in order of the CIs of the DL CCs which are targets of the CSI.

9. The many pieces of CSI of the CoMP set having the smallest CI value of the CoMP serving cell among DL CCs which are targets of the CSI of the same CoMP set in the CSI transmission subframe have a highest priority. Here, the CoMP serving cell may mean a cell transmitting the PDCCH or a cell having the minimum CI in the CoMP set, among cells included in the CoMP set.

10. The many pieces of CSI of the CoMP set having the smallest CI value of the CoMP serving cell among DL CCs in the same CoMP set have a highest priority, and the DL CCs may be limited to the activation DL CCs.

Meanwhile, in the 3., when the many pieces of CSI having the same priority are generated, the CSI having a lower CI of the DL CC which is a target of the representative value has a higher priority. Further, in the 4. to 7., when the many pieces of CSI on the cells of two or more CoMP sets have the same priority, the 3., 2., 1. may be additionally applied. When the 3. is applied, two or more many pieces of CSI may have the same priority, and in this case, the 2., 1. may be additionally applied. When the methods 3, 2, and 1 are additionally applied, the target may be limited to the groups having the same priority.

Next, an example of a method of determining a priority for each CSI in each CoMP set will be described.

The many pieces of CSI of cells included in one CoMP set follow the existing "priority for the CSI of different cells" or "CSI collision rule in the same group" when all the many pieces of CSI can not be transmitted.

The CSI measurement for the cells included in the CoMP set may be divided by indexes provided in combination of a CSI-RS resource and an interference measurement resource (IMR). In this case, when all the many pieces of CSI on the cells included in the same CoMP set may not be transmitted, the CSI having a low index provided in combination may have a highest priority.

Figure 16:
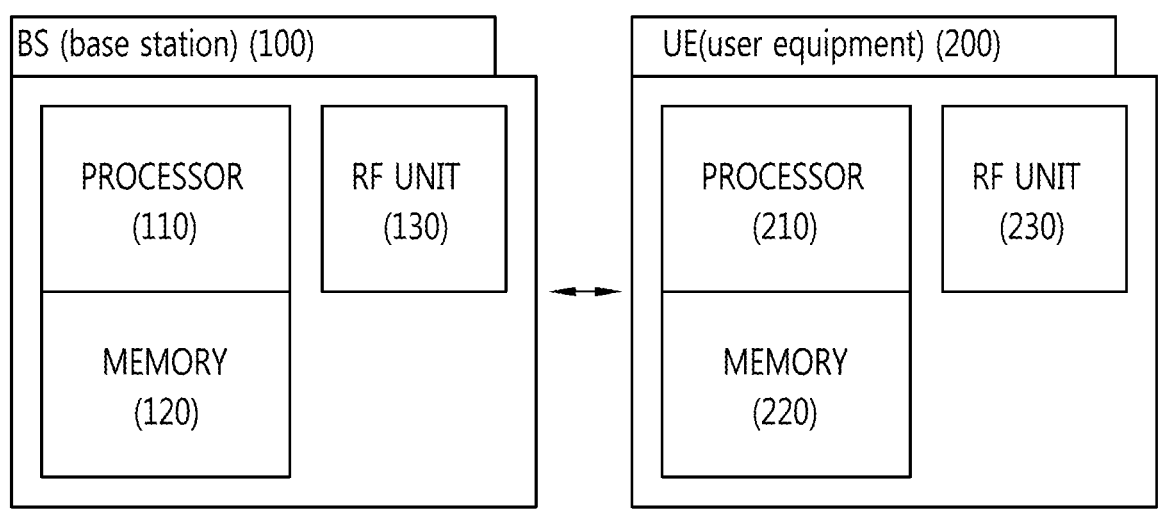
FIG. 16 is a block diagram illustrating a base station and user equipment in which the embodiment of the present invention is implemented.

FIG. 16 illustrates a configuration of a base station and user equipment according to the embodiment of the present invention.

The base station 100 includes a processor 110, a memory 120, and a radio frequency (RF) unit 130. The processor 110 implements a function, a process, and/or a method which are proposed. For example, the memory 120 is connected with the processor 120 to store various information for driving the processor 110. The RF unit 130 is connected with the processor 110 to transmit and/or receive a radio signal.

UE 200 includes a processor 210, a memory 220, and an RF unit 230. The processor 210 implements a function, a process, and/or a method which are proposed. For example, the memory 210 is connected with the processor 220 to store various information for driving the processor 210. The RF unit 230 is connected with the processor 210 to transmit and/or receive the radio signal.

The processors 110 and 210 may include an application-specific integrated circuit (ASIC), other chipset, a logic circuit, a data processing device, and/or a converter that converts a baseband signal and a radio signal to each other. The memories 120 and 220 may include a read-only memory (ROM), a random access memory (RAM0, a flash memory, a memory card, a storage medium, and/or other storage device. The RF units 130 and 230 may include one or more antennas that transmit and/or receive the radio signal. When the embodiment is implemented by software, the aforementioned technique may be implemented by a module (a process, a function, and the like) performing the aforementioned function. The module may be stored in the memories 120 and 220 and may be executed by the processors 110 and 210. The memories 120 and 220 may be present inside or outside the processors 110 and 210 and connected with the processors 110 and 210 by various well-known means.

What is claimed is:

1. A method for transmitting channel state information (CSI) of a user equipment (UE) which is configured with a first cell group and a second cell group in a wireless communication system, the method performed by the UE and comprising:
   selecting a first cell included in the first cell group and a second cell included in the second cell group,
   wherein the first cell is a cell on an activated carrier with a lowest cell index in the first cell group and the second cell is another cell on another activated carrier with a lowest cell index in the second cell group;
   generating first CSI for the first cell and second CSI for the second cell; and
   transmitting the first CSI or the second CSI, whichever has a higher priority,
   wherein a CSI having a lower cell index between the first CSI and the second CSI has the higher priority,
   wherein cells in each of the first cell group and the second cell group have a same CSI transmission period or multiples of the CSI transmission period, and
   wherein when the first CSI and the second CSI have a same priority, a CSI having a higher process identifier (ID) between the first CSI and the second CSI has the higher priority.

2. The method of claim 1, wherein the first cell and the second cell belong to different base stations.

3. The method of claim 1, wherein the UE receives cell group configuration rule information from a network, and
   wherein the UE configures the first cell group and the second cell group.

4. The method of claim 1, wherein the UE receives cell group configuration information informing the first cells of the first cell group and the second cells of the second group, and
   wherein the cell group configuration information is transmitted through a radio resource control (RRC) message.

5. The method of claim 1, wherein when a specific CSI having no process ID is present between the first CSI and the second CSI, process ID of the specific CSI is a lowest process ID.

6. A user equipment (UE) which is configured with a first cell group and a second cell group, comprising:
   a transceiver which transmits or receives a radio signal; and
   a processor, connected with the transceiver,
   wherein the processor is configured to:
      select a first cell included in the first cell group and a second cell included in the second cell group,
      wherein the first cell is a cell on an activated carrier with a lowest cell index in the first cell group and the second cell is another cell on another activated carrier with a lowest cell index in the second cell group,
      generate first CSI for the first cell and second CSI for the second cell, and
      control the transceiver to transmit the first CSI or the second CSI, whichever has a higher priority,
      wherein a CSI having a lower cell index between the first CSI and the second CSI has the higher priority,
      wherein cells in each of the first cell group and the second cell group have a same CSI transmission period or multiples of the CSI transmission period, and
      wherein when the first CSI and the second CSI have a same priority, a CSI having a higher process identifier (ID) between the first CSI and the second CSI has the higher priority.

7. The UE of claim 6, wherein the first cell and the second cell belong to different base stations.

* * * * *